United States Patent
Owa et al.

[11] Patent Number: 5,917,177
[45] Date of Patent: Jun. 29, 1999

[54] IC CARD READER

[75] Inventors: Junji Owa; Kenji Hirasawa; Hideaki Osada, all of Nagano, Japan

[73] Assignee: Sankyo Seiki Mfg. Co., Ltd., Nagano-ken, Japan

[21] Appl. No.: 08/759,437

[22] Filed: Dec. 5, 1996

[30] Foreign Application Priority Data

| Dec. 13, 1995 | [JP] | Japan | 7-324283 |
| Dec. 13, 1995 | [JP] | Japan | 7-324392 |
| Dec. 26, 1995 | [JP] | Japan | 7-338577 |

[51] Int. Cl.⁶ ............ G06F 17/60; G06K 7/00
[52] U.S. Cl. .......... 235/486; 235/379; 235/487; 235/492; 235/382
[58] Field of Search ............ 235/486, 487, 235/492, 379, 382, 383

[56] References Cited

U.S. PATENT DOCUMENTS

| 4,672,661 | 6/1987 | Clark, Jr. et al. | 235/382 |
| 5,010,239 | 4/1991 | Mita | 235/492 |
| 5,045,674 | 9/1991 | Mita et al. | 235/449 |
| 5,051,566 | 9/1991 | Pernet | 235/441 |
| 5,065,004 | 11/1991 | Mizuno et al. | 235/482 |
| 5,331,138 | 7/1994 | Saroya | 235/492 |
| 5,594,233 | 1/1997 | Kenneth et al. | 235/492 |

FOREIGN PATENT DOCUMENTS 64-27756  2/1989  Japan.

*Primary Examiner*—Donald Hajec
*Assistant Examiner*—Daniel St. Cyr
*Attorney, Agent, or Firm*—McAulay Nissen Goldberg Kiel & Hand, LLP

[57] ABSTRACT

An IC card reader comprises a card driving path through which a proximity IC card having a card side terminal as a non-contact type input/output terminal can be driven. The card side terminal is capable of providing and receiving electrical signals. A reader side terminal is positioned opposite the card side terminal at a stop position of the proximity IC card. The reader side terminal is capable of providing and receiving electrical signals for communication with the card side terminal. A card pressing member is provided opposite the reader side terminal, upon interposing the proximity IC card therebetween, for pressing the proximity card toward the reader side terminal. Other embodiments of the IC card reader are described.

21 Claims, 21 Drawing Sheets

FIG. I

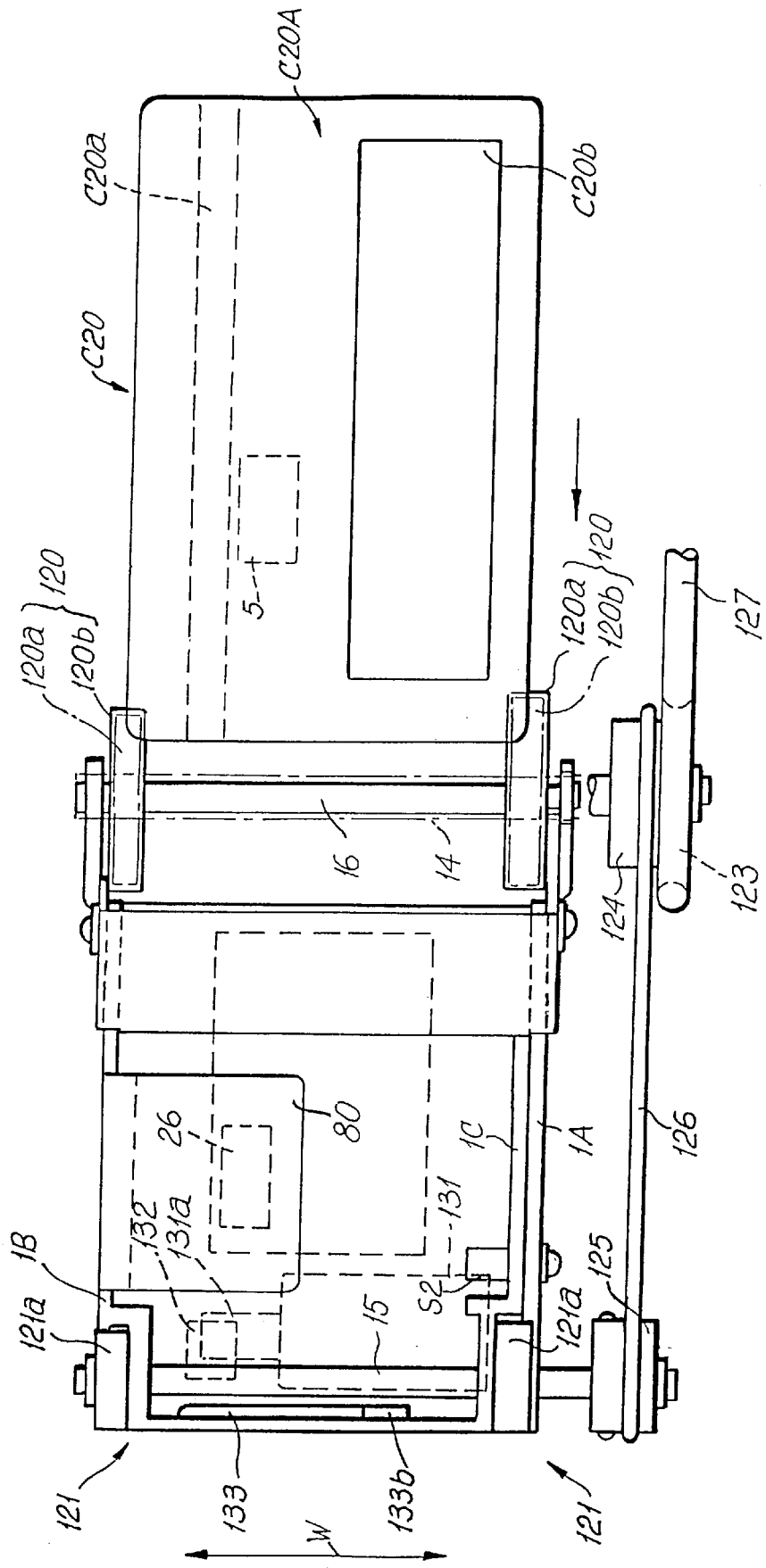

IC CARD READER

BACKGROUND OF THE INVENTION a) Field of the Invention

This invention relates to an IC card reader that permits transactions for an IC card having a non-contact type input/output terminal and an integrated circuit (IC chip), and further relates to an IC card reader that also permits transactions for an IC card having a contact type input/output terminal and an integrated circuit (IC chip).

b) Description of the Related Art

An IC card in which an IC chip is built-in has been utilized because of its capability to record/retrieve a large amount of information as compared to a magnetic card. The IC card generally uses a contact method wherein information is communicated by contacting contact wires provided on a card reader which records/reads information on/from the IC card with a contact type input/output terminal of the IC chip.

On the other hand, a non-contact type IC card is under research in which a non-contact type input/output terminal having metallic plates, coils, and the like is built. With respect to the non-contact type input/output terminal in the IC card, a signal transmission unit (hereafter denoted as "IC module") comprising metallic plates or coils is provided; the current containing information is supplied to the IC module, and a potential is generated, by electromagnetic induction or capacitance, between the non-contact type input/output terminal and the IC module; and the generated potential is converted for inserting and removing information. The non-contact type IC card includes, for example, a proximity IC card which has been developed in International Standard Organization (ISO) standard 10536.

When one drives a proximity IC card or a contact type IC card in a card driving path, it is necessary to consider countermeasures for deformed cards. In other words, if the distance in the thickness direction of the card driving path is small, a problem can occur in which the deformed card is stuck in the path or the driving resistance is increased. Also, the input/output of information to/from the proximity IC card is done by generating a potential by electromagnetic induction or capacitance between the non-contact type input/output terminal on the card and the signal transmission unit on the reader. Therefore, if the card driving path is wide or the deformation of a card is large, the distance between the non-contact input/output terminal on the card and the signal transmission unit on the reader becomes large, thus making it difficult for a magnetic field or charge to be transferred.

In addition, when the proximity IC card is processed, there is a problem needed to be solved with regard to the electromagnetic transducing efficiency between a coil portion (the non-contact input/output terminal) on the card (hereafter denoted as "the card side coil unit") and a coil portion provided on the IC module (the signal transmission unit) on the reader (hereafter denoted as "the reader side coil unit"). That is, since the thickness and size of an IC card is standardized, the winding number of the coil unit built in the card is also limited. When the IC module is fixed near the card driving path, the card side coil unit faces the reader side coil unit in the card driving path. The width of the card driving path is designed to be larger than the card thickness considering the curve of the card or the driving resistance with the card; therefore, it is difficult to narrow the distance between the card side coil unit and the reader side coil unit. When the card is curved, the distance between the card side coil unit and the reader side coil unit is not constant, and thus the electromagnetic transducer efficiency, that is, an electromotive force (emf) generated in the coil portion on the card cannot be increased.

Further, different information record/readout (communication) methods are used in a commercialized contact type IC card and in the proximity IC card under research. Therefore, if one tries to arrange a card reader (information record/readout system) for each type of card, problems occur such that the cost for the card reader increases and the space has to be large.

OBJECT AND SUMMARY OF THE INVENTION

A first object of this invention is to solve the above mentioned problems which occur when the proximity IC card is used, and to provide an IC card reader that can surely permit information to be provided in/out from even the proximity IC card; moreover, a second object is to provide an IC card reader that can transact both a contact IC card and a proximity IC card in one card reader.

In accordance with the invention, an IC card reader comprises a card driving path through which a proximity IC card having a card side terminal as a non-contact type input/output terminal can be driven. The card side terminal is capable of providing and receiving electrical signals. A reader side terminal is positioned opposite the card side terminal at a stop position of the proximity IC card. The reader side terminal is capable of providing and receiving electrical signals for communication with the card side terminal. A card pressing member is provided opposite the reader side terminal, upon interposing the proximity IC card therebetween, for pressing the proximity card toward the reader side terminal.

BRIEF DESCRIPTION OF THE DRAWINGS

In the drawings:

FIG. 8(*b*) is a plan view of the proximity type IC card;

FIG. 18 is a plan view of the third embodiment;

DESCRIPTION OF THE PREFERRED EMBODIMENTS

Figure 1:
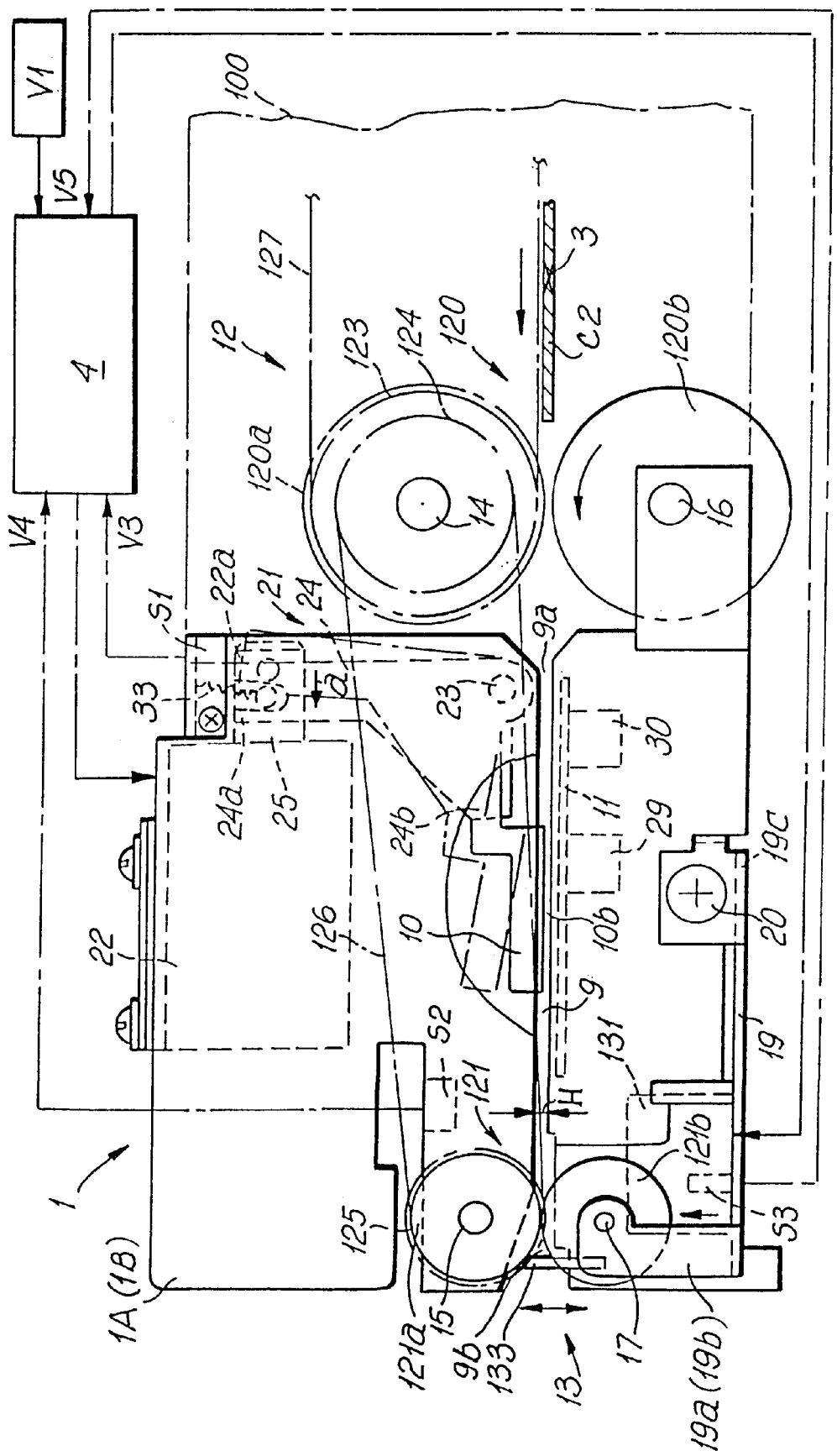
FIG. 1 illustrates a side view of the configuration of an IC card reader illustrating the first embodiment of this invention.

Embodiments of this invention are described hereafter referring to the drawings. The IC card reader illustrated by code 1 in FIG. 1 transacts a proximity type IC card C2 (hereafter denoted as "a proximity card C2") having a card side terminal 3 (a non-contact type input/output terminal).

Figure 8A:
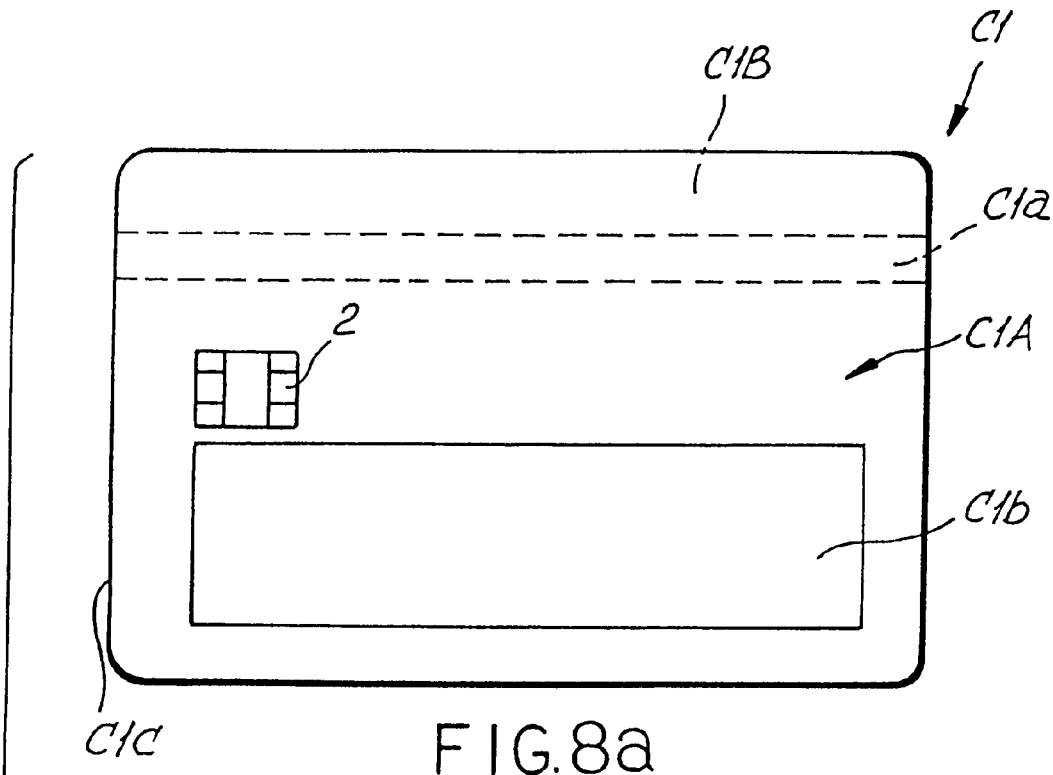
FIG. 8(*a*) is a plan view of the contact type IC card.
Figure 8B:
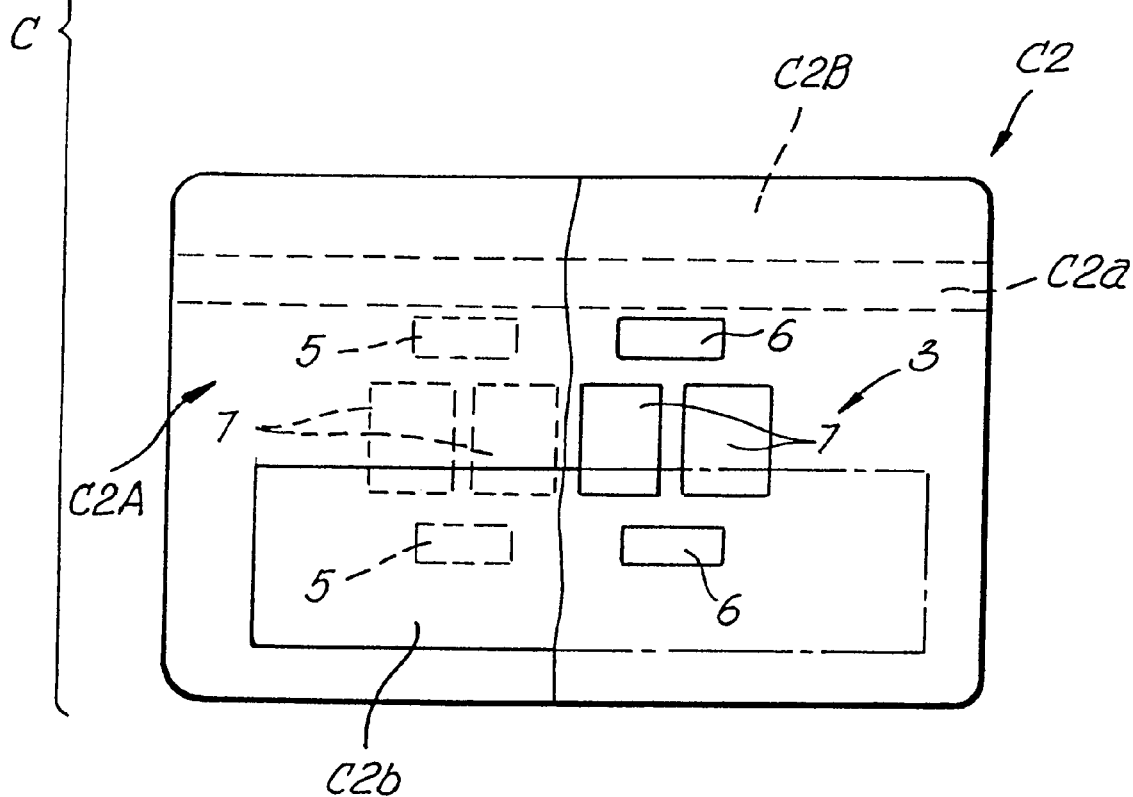

The proximity card C2 has, as illustrated in FIG. 8(b), a character area C2b on a card front C2A, in which characters can be embossed. On one side of the card back C2B a magnetic stripe C2a is provided on/from which magnetic information is recorded/retrieved. Inside the proximity card C2, the card side terminal 3 having a plurality of coils 5 and 6 and a plurality of metallic plates 7 (conductors) is provided. The card side terminal 3 is connected to an IC chip (not illustrated) in the card; it converts the potential (voltage) from the fluctuations in electromotive force generated in the coils 5 and 6 or the metallic plates 7 and the fluctuations in capacitance which are caused by the fluctuation in voltage supplied in a non-contacting way from a reader side terminal (a signal transmission unit) (described later), to provide information in/out on/from the IC chip.

Figure 2:
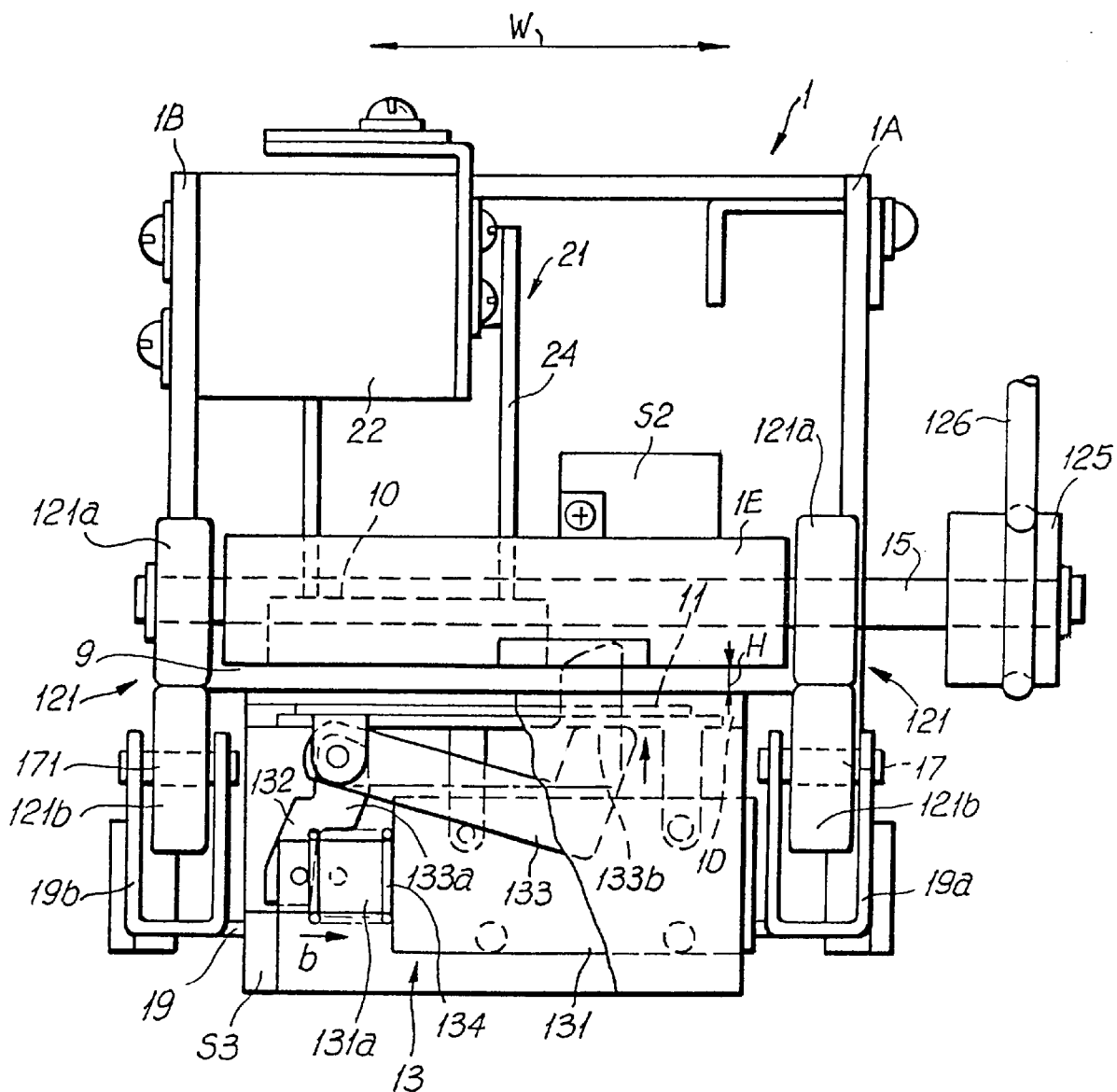
FIG. 2 shows a front view of the first embodiment.

The IC card reader 1, as illustrated in FIGS. 1 and 2, primarily comprises a card driving path through which a proximity card C2 is driven, a reader side terminal 11 positioned to be opposite the card side terminal 3 at the stop position of the proximity IC card C2 which communicates signals with the card side terminal 3; a card pressing member 10 for pressing the IC card (the proximity card C2), which is moving in the card driving path 9, toward the reader side terminal 11, its driving mechanism 21, and a transmission mechanism 12 for moving the proximity card C2 and its control means 4.

To the IC card reader 1, a magnetic card reader 100 is connected which communicates (records/retrieves) the magnetic information with a magnetic stripe C2a. The magnetic card reader 100 is programmed so that it rotates a driving motor (not illustrated) in the right direction when a card is sensed by a card sensor (not illustrated), and the magnetic information is communicated between a magnetic head (not illustrated) and the magnetic stripe C2a for information recording/retrieval and for card assortment. In the magnetic head, if the card is a proximity card C2, an assortment signal V1 is supplied to the control means 4.

The card transmitting path (not illustrated) of the magnetic card reader 100 and a slot 9a of the card driving path 9 are continuous, and the proximity card C2 which has finished communicating magnetic information is driven toward the IC card reader 1 by a publicly known transferring means. A driving motor comprising the transferring means is connected to the transmission mechanism 12. A left-right rotatable motor is used for the driving motor; it rotates pairs of transmission rollers 120 and 121, so that the proximity card C2 is driven inwardly of the IC card reader 1 with a right rotation, and the proximity card C2 is driven from the IC card reader 1 toward the magnetic card reader 100 with a left rotation.

The transmission mechanism 12 comprises pairs of driving rollers 120 and 121 and driving pulleys 123, 124, and 125 which constitute a drive transmission unit. The driving pulleys 123 and 124 are formed integral and fixed on a driving shaft 14; the driving pulley 125 is fixed on a driving shaft 15. A transmission belt 126 is wound around the driving pulleys 124 and 125; a belt 127 driven by the driving motor of the magnetic card reader 100 is wound around the driving pulley 123. A pair of driving rollers 120 include driving rollers 120a fixed on the driving shaft 14, and subsidiary rollers 120b which are arranged opposite the driving rollers 120a and rotatably supported by the shaft 16.

Figure 3:
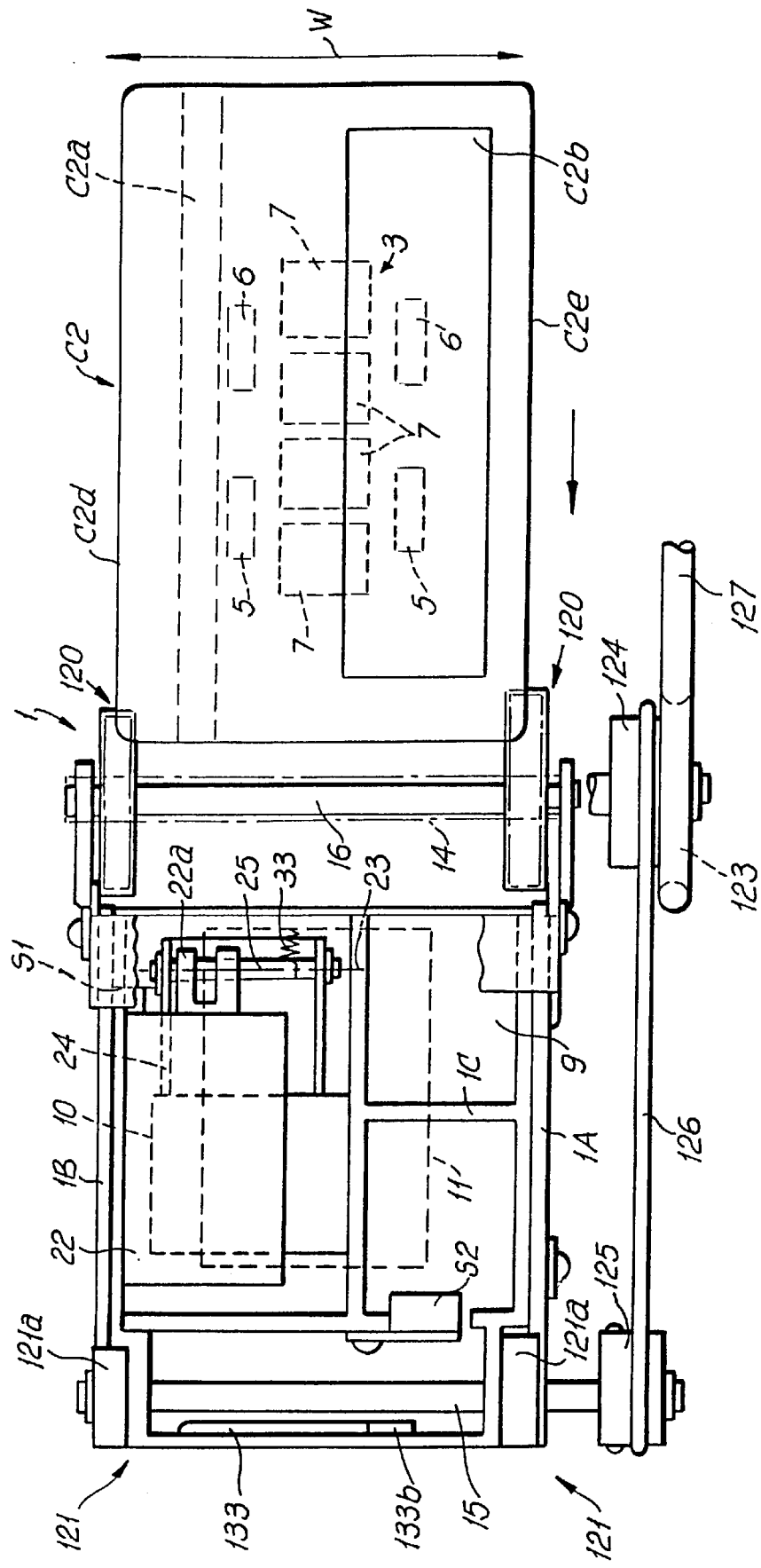
FIG. 3 is a plan view of the first embodiment.

A pair of driving rollers 121, as illustrated in FIG. 1, are constituted of driving rollers 121a fixed on the driving shaft 15 and subsidiary rollers 121b which are arranged opposite the driving rollers 121a and rotatably supported by a shaft 17. A pair of driving rollers 121 are positioned respectively in the width direction (arrow W) of the card driving path 9 as illustrated in FIGS. 2 and 3. The driving shaft 15 is rotatably supported by frames 1A and 1B. The shaft 17 is journaled with the free-end curved sections 19a and 19b of a flat spring 19. A base end 19c of the flat spring 19, as illustrated in FIG. 1, is fixed on frames 1A and 1B via machine screws 20, and presses and energizes the subsidiary rollers 121b toward the driving rollers 121a. Pairs of the driving rollers 120 and 121 are positioned, as illustrated in FIG. 3, such that they hold the vicinity of the card edges C2d and C2e, outside the character area C2b and the magnetic stripes C2a.

The card driving path 9 constitutes its side surfaces with frames 1A and 1B and its top and bottom surfaces with frames 1D and 1E. The distance H of the card driving path 9 in the thickness direction of the proximity card C2 is set to the dimension at which a deformed and curved proximity card C2 can be transmitted. Here, the distance H is set to be the card thickness plus about 2 to 3 mm; when the level of the deformation of the proximity card C2 is larger than the distance H, the deformed card cannot be inserted.

Figure 4:
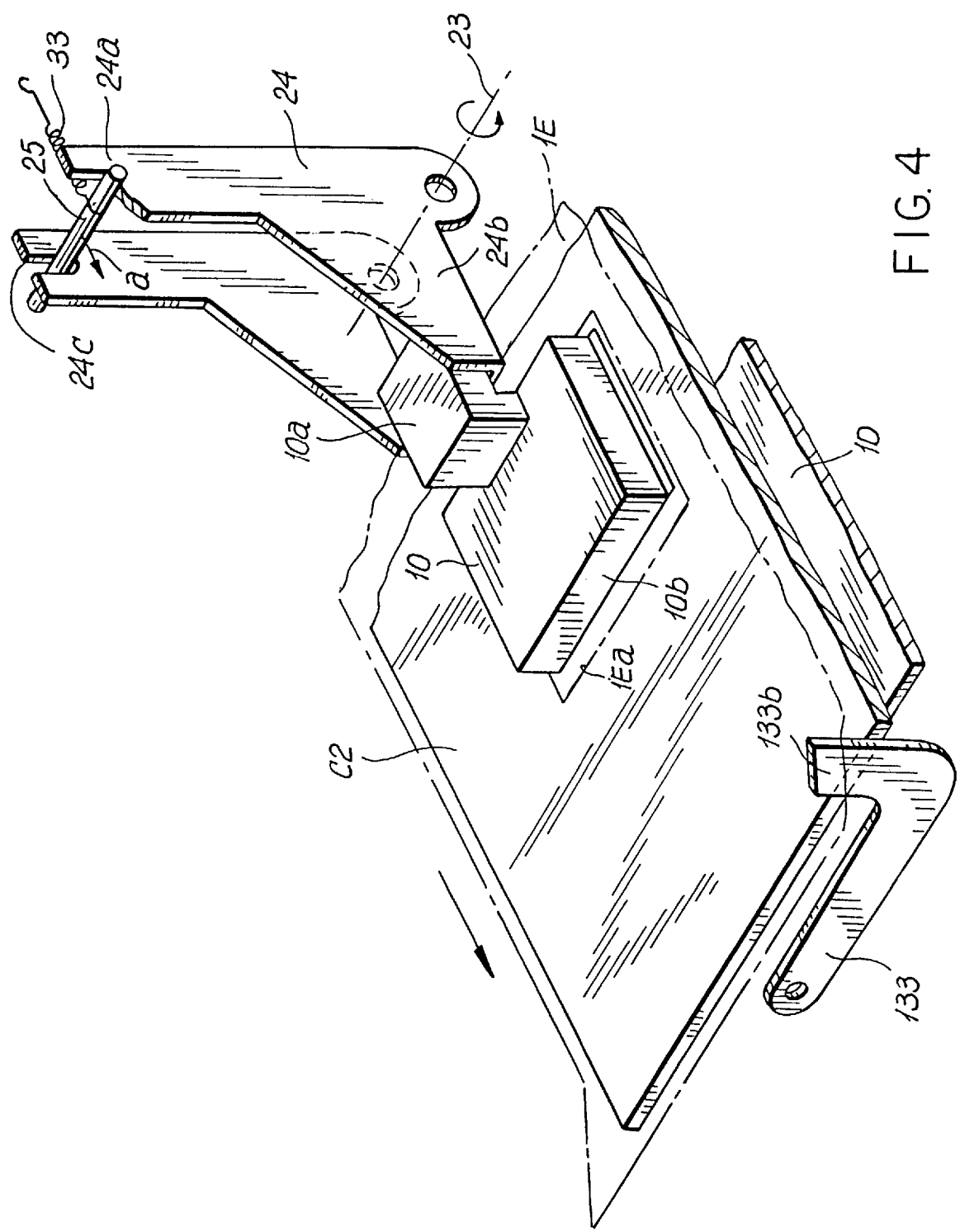
FIG. 4 is a perspective view showing the configuration of the card pressing member and its driving mechanism.

The card pressing member 10 is positioned upstream in the card driving path 9 closer to frame 1B from the center of the card driving path 9, and opposite the reader side terminal 11, interposing the proximity card C2 therebetween; it is capable of pressing the center area of the proximity card C2. Also, as illustrated in FIG. 4, it faces inward from an opening 1E*a* in frame 1E toward the card driving path 9. The driving mechanism 21 is mainly constituted, as illustrated in FIG. 3, with an electromagnetic solenoid 22 (actuator) and a rotary arm 24 which is rotatably supported by a shaft 23 with respect to frame 1C fixed inside of side plates 1A and 1B.

The rotary arm 24 is bent so as to be vertically concave in cross-section as illustrated in FIG. 4; its sides are formed in an L shape; the upper end 24*a* positioned upstream in a rotary edge is connected to a movable piece 22*a* of the electromagnetic solenoid 22 via a pin 25. The pin 25 is engaged with a U-shaped groove formed in the upper end 24*a*, and is snapped in the axial direction by an appropriate member such as a ring (not illustrated). To a moving edge 24*b* positioned in the left side of the rotary edge, the base edge 10*a* of the card pressing member 10 is mounted. The card pressing member 10 is made of synthetic resin, so it is preferable to attach a card protective member made of a flexible rubber sheet or its equivalent to the bottom surface 10*b* of the card pressing member 10.

The electromagnetic solenoid 22 normally positions the rotary arm 24 at a receded position (illustrated by two-dotted lines in FIG. 1) from the card driving path 9, using a pull coil spring 33 which is engaged at both ends with the pin 25 and frame 1C respectively. The electromagnetic solenoid 22 is turned on when the current flows; the movable piece 22*a* is taken in the direction of arrow a; and the rotary arm 24 is placed at an entering position illustrated by solid lines in the same figure. In this embodiment, the proximity card C2 is pressed toward frame 1D which constitutes the bottom surface of the card driving path 9. Frame 1D is a reference surface for the drive of the proximity card C2.

Figure 5:
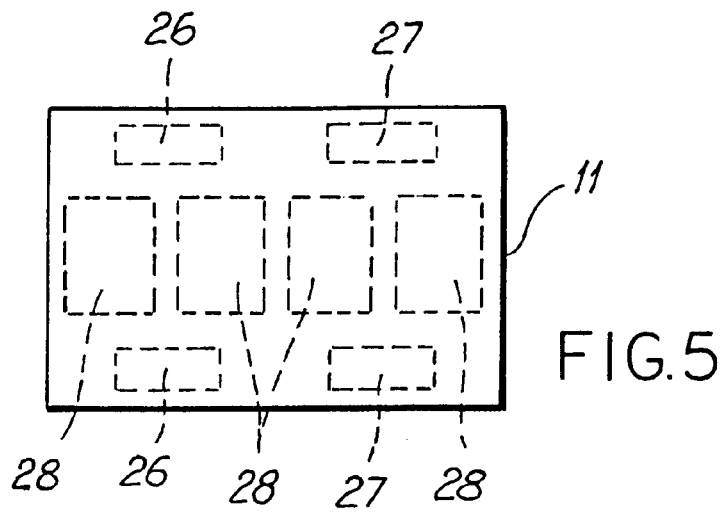
FIG. 5 is a plan view showing the configuration of the reader side terminal.

The reader side terminal 11 is installed at a position at which it is a bottom surface of frame 1D and adjacent to the card driving path 9, being in parallel to the card driving path 9; as illustrated in FIG. 5, it comprises coils 26 and 27 having the same number of windings in the same direction as the coils 5 and 6 of the card side terminal 3, and the metallic plates 28 having the same configuration as that of the metallic plates 7. The frame 1D of the reader side terminal 11 on the card driving path 9 side is determined to have thickness which does not hinder signal transmission by electromagnetic induction and capacitance. At the bottom of the reader side terminal 11 as illustrated in FIG. 1, connectors 29 and 30 are provided; the connector 29 is connected to the coils 26 and 27, and the connector 30 is connected to the plurality of metallic palates 28 (conductors). The connectors 29 and 30 are connected to the control means 4, and a voltage which fluctuates according to information supplied from the control means 4 and a constant voltage for driving an IC chip are supplied to the coils 26 and 27 and the metallic pates 28.

In the vicinity of a pair of driving rollers 121, a stopper mechanism 13 is provided. The stopper mechanism, as illustrated in FIG. 2, primarily comprises a stopper member 133 which is rotatably supported by frame 1D, an electromagnetic solenoid 131 which drives the stopper member 133 to move with respect to the card driving path 9, and a lever 132 for connecting the electromagnetic solenoid 131 and the stopper member 133. Both ends of the lever 132 are connected by pins to the movable piece 131*a* of the electromagnetic solenoid 131 and the base edge 133*a* of the stopper member 133.

The electromagnetic solenoid 131 normally positions the stopper member 133 at the receded position (illustrated by solid lines in FIG. 2) from the card driving path 9, using a coil spring 134 wound to the movable piece 131*a*; it is turned on when the current flows to take in the movable piece 131*a* in the direction of arrow b; and the tip 133*b* of the stopper member 133 is placed at the entering position to the card driving path 9. The stopper member 133 is arranged closer to the end 9*b* of the card driving path 9 than a pair of the driving rollers 121, so that it stops the proximity card C2 at the stop position where the card side terminal 3 faces the reader side terminal 11.

In the vicinity of the electromagnetic solenoid 22, a detach sensor S1 is provided as illustrated in FIG. 1, which provides a detach signal V3 to the control means 4 when the movable piece 22*a* moves in the direction of arrow a. Over the card driving path 9 placed between a pair of the driving rollers 121 and the card pressing member 10, a card positioning sensor S2 is provided. The sensor S2 is an optical sensor which provides the stop signal V4 to the control means 4 when the proximity card C2 moves under the sensor S2. In the vicinity of the electromagnetic solenoid 131, a stopper actuating sensor S3 is provided. The sensor S3 is programmed such that it supplies the stopper signal V5 to the control means when the movable piece 131*a* moves in the direction of arrow b (see FIG. 2).

The control means 4 is a control system for controlling both the magnetic card reader 100 and IC card reader 1, and it is primarily constituted of a publicly known microcomputer. The control means 4 determines the type of card inserted using a card assortment signal V1 supplied from a magnetic head (not illustrated); it stops the driving motor of the magnetic card reader 100 to stop the transmission mechanism 12 when the stop signal V4 is supplied from the sensor S2, and at the same time, conducts the electromagnetic solenoid 131 to drive it. Also, the control means 4 conducts the electromagnetic solenoid 22 and turns it on when the stopper signal V5 is supplied from the sensor S3; it supplies a constant voltage and a voltage which fluctuates according to information to the connectors 29 and 30 when the detach signal V3 is supplied from the sensor S1; when the information communication ends, it turns off the electromagnetic solenoids 22 and 131, and rotates the driving motor counterclockwise.

The operation of the IC card reader 1 having such a configuration will now be described.

First, when the proximity card C2 is inserted in the magnetic card reader 100 illustrated in FIG. 1, a card sensor (not illustrated) actuates the driving motor, and the magnetic information recording/retrieval is done by a magnetic head (not illustrated) while the card C2 is driven in the magnetic card reader 100. When the driving motor is activated, its rotation is transmitted to the transmission mechanism 12 via the belt 127 and pulley 123, then the pairs of the driving rollers 120 and 121 become ready to rotate. Here, since the proximity card C2 is inserted into the magnetic card reader 100, the assortment signal V1 is supplied to the control means 4, and the card C2 is transferred to the card driving path 9 as illustrated in FIG. 3.

Figure 6:
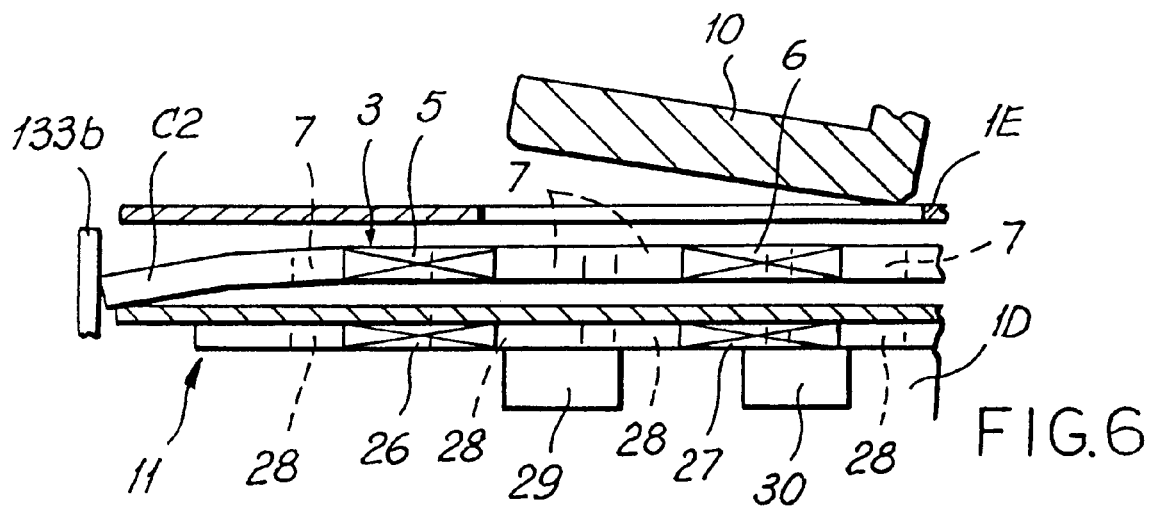
FIG. 6 is a magnified view showing the proximity IC card stopped at its stop position.

The transferred proximity card C2 is held by a pair of the driving rollers 120 while running through the card driving path 9. When the card edge is sensed by the sensor S2 and the stop signal V4 is supplied from the sensor S2, the driving motor stops, the electromagnetic solenoid 131 is turned on, and the movable piece 131*a* shifts in the direction of arrow b in FIG. 2. When the movable piece 131*a* shifts, the stopper member 133 rotates via the lever 132 from the receded position (illustrated by solid lines) to the entering position (illustrated by dotted lines), then the tip 133b, as illustrated in FIG. 6, contacts the end of the proximity card C2 placed and driven in the card driving path 9.

Figure 7:
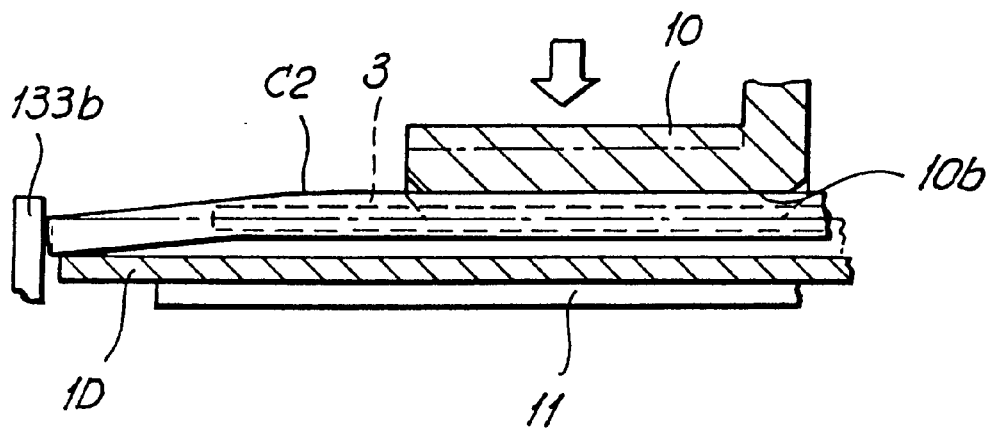
FIG. 7 is a magnified view showing the proximity IC card pressed by the card pressing member.

When the movement of the movable piece 131a is sensed by the sensor S3, the stopper signal V5 is provided, the electromagnetic solenoid 22 is turned on, and the movable piece 22a is taken in the direction of arrow a in FIG. 1. With this operation, the detach signal V3 is provided, the rotary arm 24 is shifted rotating from the detach position (illustrated by two-dotted lines) to the abut position (illustrated by broken lines), and the card pressing member 10 is lowered. As illustrated in FIG. 7, the proximity card C2 stops so that the card side terminal 3 faces the reader side terminal 11.

If the proximity card C2 is curved upward as illustrated by solid lines, the proximity card C2, following the lowering operation of the card pressing member 10, is pressed toward the reader side terminal 11 (as illustrated by two-dotted lines in FIG. 7) by the bottom surface of the card pressing member 10; the curve of the edge of the proximity card C2 toward frame 1D is pressed down so that the deformation of the proximity card C2 is corrected. When the detach signal V3 and card assortment signal V1 are supplied from the sensor S2 to the control means 4, a voltage is supplied to the coils 26 and 27 and the plurality of metallic plates 28 via the connectors 29 and 30. As illustrated in FIG. 6, then, an electromotive force is generated between the coils 26 and 27 and the coils 5 and 6, being changed due to the supplied variable voltage which has varied according to the information, and a potential (voltage) due to the variation is generated. Between the metallic plates 28 and the metallic plates 7, a potential (voltage) is generated due to the variation in capacitance, and then it is converted to provide in/out the information on/from the proximity card C2.

Therefore, the distance between the card side terminal 3 formed on the proximity card C2 and the reader side terminal 11 formed on frame 1D becomes narrow even when the card is deformed. For this reason, the magnetic field generated in the coils 26 and 27 or the charge generated in the metallic plates 28 can be efficiently transmitted to the coils 5 and 6 and the metallic plates 7 on the card side terminal, making it possible to stabilize the input/output of information and relatively to reduce the voltage supplied to the reader side terminal 11.

In addition, since the proximity card C2 is pressed toward the frame 1D by the card pressing member 10, even if the distance H of the card driving path 9 is made sufficiently large, the distance between the card side terminal 3 on the proximity card C2 and the reader side terminal 11 can be narrow, and it is possible to reduce the chances for card jams and driving resistance while stabilizing the input/output of information. The decrease in driving resistance results in reducing the load to the transmission mechanism 12 and pairs of the driving rollers 120 and 121, thus making it possible to improve their durability.

After the input/output of information to/from the proximity card C2, the current to the electromagnetic solenoids 22 and 131 is cut off to turn them off. Then, the card pressing member 10 and stopper member 133 recede from the card driving path 9 due to the elastic potential energy of the spring 33 and the coil spring 134, and the driving motor is rotated in a left direction. By this left rotation, the proximity card C2 in the card driving path 9 moves toward the slot 9a, and is discharged from the IC card reader 1 and magnetic card readers 100 connected to the IC card reader 1.

Next, a second embodiment of this invention is described.

Figure 9:
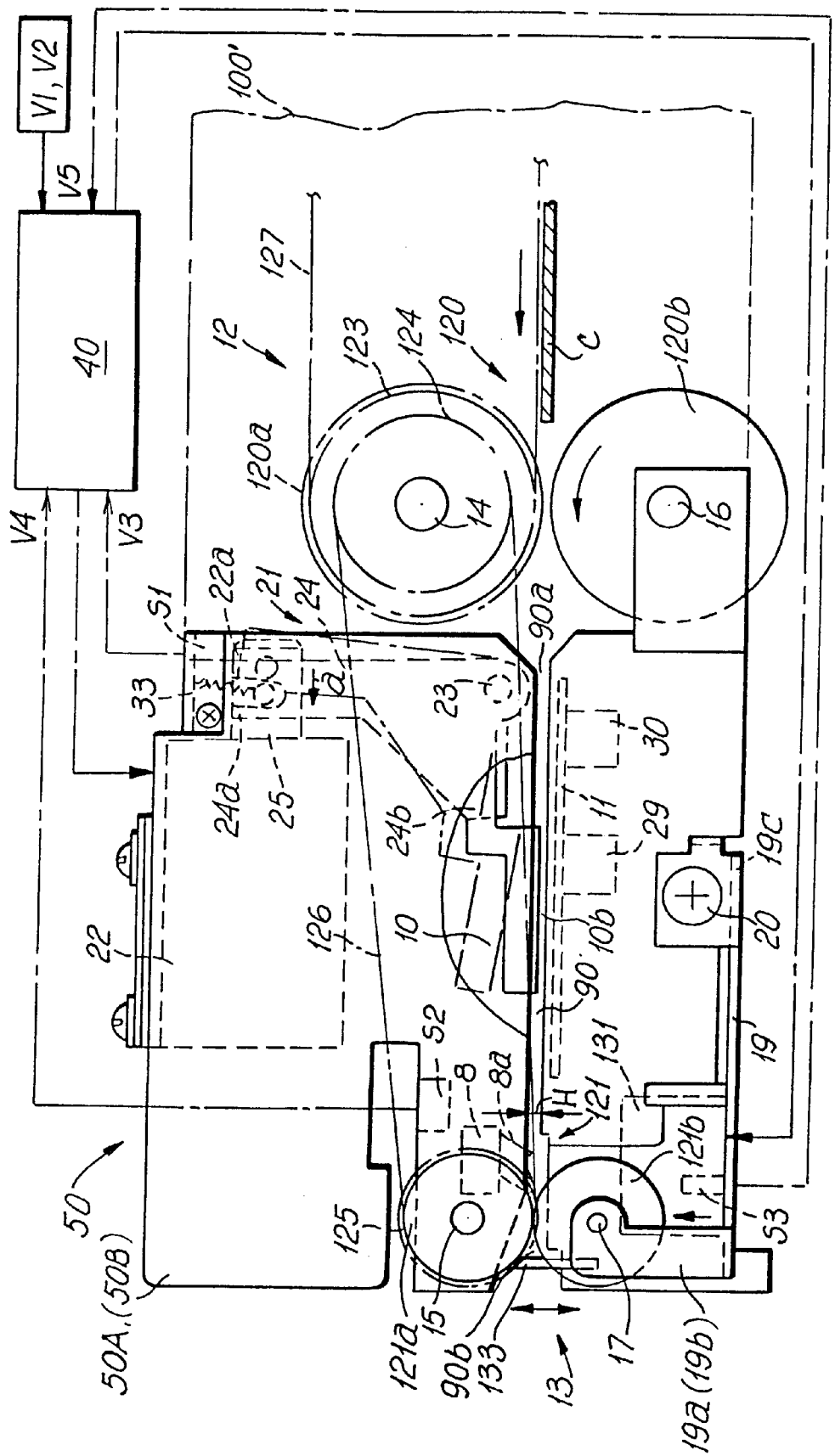
FIG. 9 is a side view of the configuration of an IC card reader showing a second embodiment of this invention.

The IC card reader 50 in FIG. 9 is a two-way card processor which transacts a contact-type IC card C1 having a contact-type input/output terminal 2 (hereafter denoted as "contact card C1") on a card front C1A (illustrated in FIG. 8(a)) and the above mentioned proximity card C2. Note that this embodiment uses the same element designations as in the first embodiment for members having the same configuration and operation as in the first embodiment, and their detailed descriptions are omitted.

The contact card C1, as illustrated in FIG. 8(a), has a contact-type input/output terminal 2 (hereafter denoted as "contact terminal 2") on a card front C1A. The contact terminal 2 is connected to an IC chip (not illustrated) in the card. A character area C1b in which characters can be embossed is formed at the bottom on the card front C1A. On one side of a card back C1B a magnetic stripe C2a is provided on/from which magnetic information is recorded/retrieved.

Figure 10:
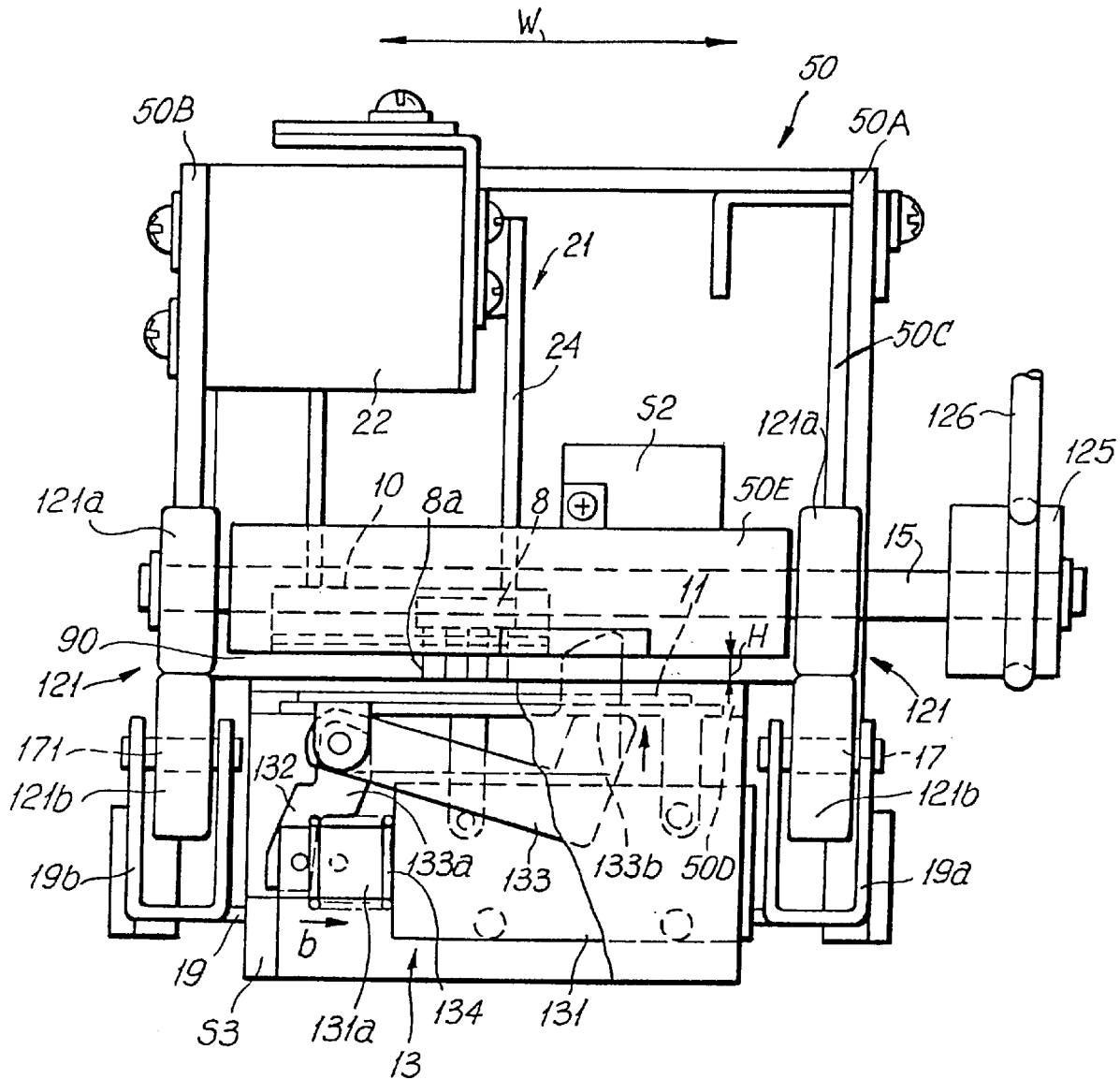
FIG. 10 is a front view of the second embodiment.
Figure 11:
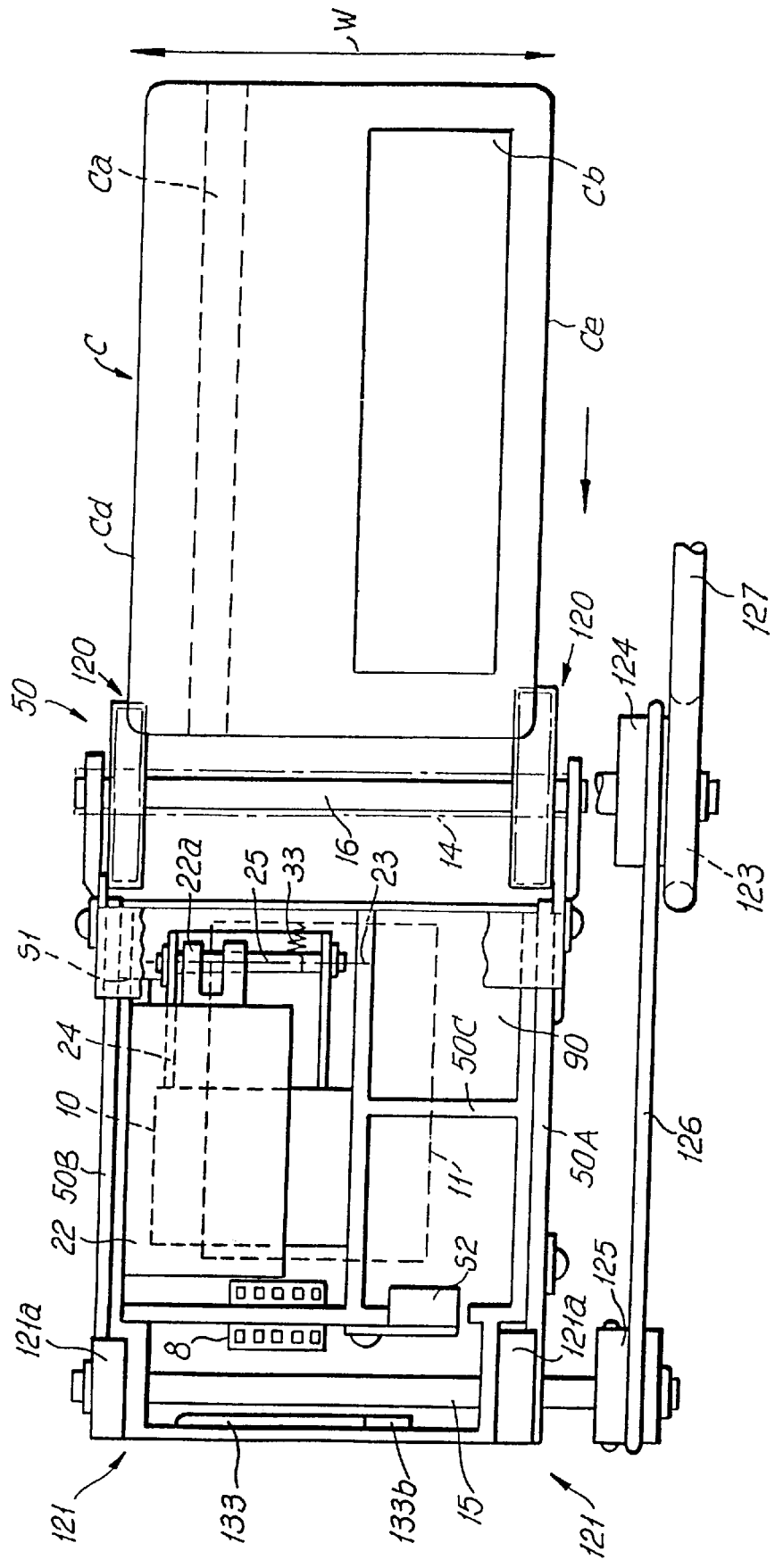
FIG. 11 is a plan view of the second embodiment.

The IC card reader 50, as illustrated in FIGS. 9 and 10, primarily comprises a card driving path 90 through which both a contact card C1 and a proximity card C2 are commonly driven, a contact block 8 which is placed upstream in the card driving path 90 and is capable of contacting the contact terminal 2, a reader side terminal 11 which is placed downstream in the card driving path 90 and communicates signals with a non-contact terminal 3, a card pressing member 10 for pressing the IC card running in the card driving path 90 toward the reader side terminal 11 and its driving mechanism 21, and a transmission mechanism 12 for driving the IC card C and its control means 40.

To the IC card reader 50, a magnetic card reader 100' is connected which communicates (records/retrieves) the magnetic information with the magnetic stripes C1a and C2a, in which the magnetic information is communicated between the magnetic head (not illustrated) and the magnetic stripes C1a and C2a to record/retrieve information and to sort card types. In this magnetic head, an assortment signal V2 is supplied to the control means 40 for the contact card C1, and an assortment signal V1 is supplied thereto for the proximity card C2.

A card transmitting path (not illustrated) in the magnetic card reader 100' and the slot 90a of the card driving path 90 are continuous; the contact card C1 or proximity card C2 for which the communication of magnetic information is finished is transferred to the IC card reader 50 using a transmission means (not illustrated). A stepping motor having left-right rotations is used for a driving motor constituting the transmission means, which rotates the pairs of the driving rollers 120 and 121 in the same manner as in the aforementioned embodiment.

The card driving path 90 constitutes its side surfaces with frames 50A and 50B and its upper and bottom surfaces with frame 50D and 50E. The distance H of the card driving path 90, corresponding to the thickness direction of the IC card C, is set to the width at which even a deformed and curved IC card C can be inserted and driven.

The contact block 8 is fixed on frame 50C and arranged in the vicinity of a pair of the driving rollers 121, in which a plurality of contact wires 8a are formed for putting information in/out by contacting the contact terminal 2. The contact wires 8a comprise a conductive spring material, and are formed at a slant from the contact block 8 toward the card driving path 90.

A card pressing member 10 is provided upstream in the card driving path 90, opposite the reader side terminal 11 interposing the IC card C therebetween, so that it can press the center area of the IC card C. The card pressing member 10, supported by the same driving mechanism 21 as in the first embodiment, freely moves in and out of the card driving path 90; frame 50D is a reference surface for the IC card C to run on. The reader side terminal 11 is mounted at a position which is at the bottom surface of frame 50D and adjacent to the card driving path 90, being in parallel to the card driving path 90, and faces the card pressing member 10; it is connected to the control means 40 via the connectors 29 and 30. The reader side terminal 11 supplies a voltage which varies according to the information supplied from the control means 40 and a constant voltage for driving the IC chip to the coils 26 and 27 and metallic plates 28.

In the vicinity of a pair of the driving rollers 121, the same stopper mechanism 13 is provided as in the first embodiment, so that it stops the contact card C1 and proximity card C2 at the position where the contact terminal 2 faces the contact point 8a and the card side terminal 3 faces the reader side terminal 11.

The control means 40 is a control system which controls both the magnetic card reader 100' and the IC card reader 50, and determines whether the inserted card type is a contact card C1 or proximity card C2, using card assortment signals V1 and V2 supplied form a magnetic head (not illustrated).

The operation of the IC card reader 50 having such a configuration will now be described.

When an IC card is inserted in the magnetic card reader 100' illustrated in FIG. 9, a driving motor is driven by a card sensor (not illustrated), and magnetic information is recorded/retrieved by a magnetic head (not illustrated) while the IC card is being driven in the magnetic card reader 100'. Then, an assortment signal V2 is supplied to the control means 40 when the card inserted in the magnetic card reader 100' is a contact card C1; an assortment signal V1 is supplied to the control means 40 for a proximity card C2.

Figure 12:
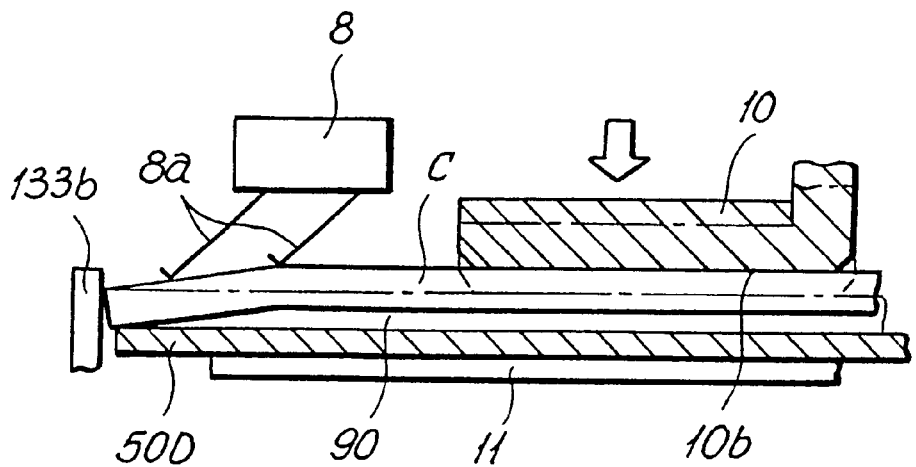
FIG. 12 is a magnified view showing the configuration and operation of the card pressing member for the IC card and its driving mechanism.
Figure 13:
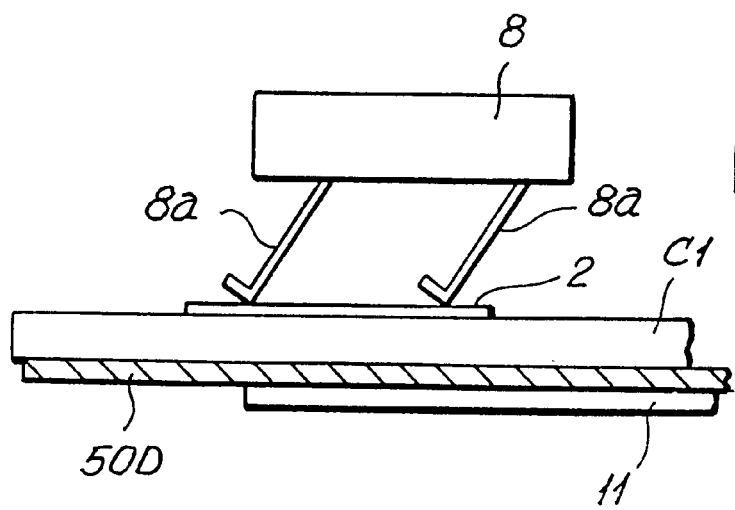
FIG. 13 is a magnified view showing the contact condition between the contact type input/output terminal and the contact wires.
Figure 14:
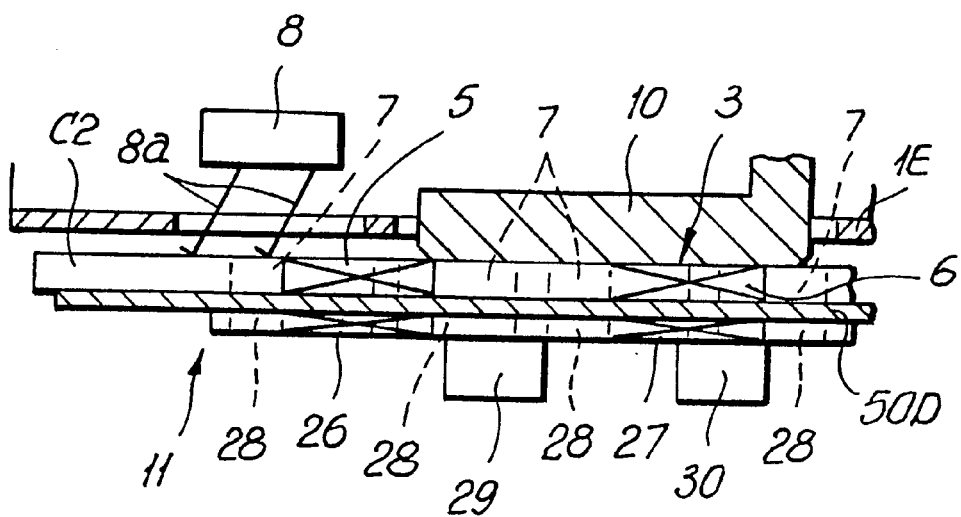
FIG. 14 is a magnified view showing the communication condition for the proximity IC card.

The transmitted IC card C is held by the a pair of driving rollers 120 while it runs in the card driving path 90. When the card is sensed by a sensor S2 and a stop signal V4 is provided, the driving motor is stopped and the electromagnetic solenoid 131 is turned on. Then, the stopper member 133 is rotated from the receded position (illustrated by solid lines as illustrated in FIG. 10) to the entering position (illustrated by two dotted lines), and the transmitted IC card C is stopped as illustrated in FIG. 12. At this time, when the driven IC card C is a contact card C1, as illustrated in FIG. 13, the contact terminal 2 abuts the contact wires 8a and information is put in/out; when the card is a proximity card C2, as illustrated in FIG. 14, the card is stopped so that the reader side terminal 11 faces the card side terminal 3.

Note that when the movement of the movable piece 131a is sensed by the sensor S3, a stopper signal V5 is provided, the electromagnetic solenoid is turned on, and the card pressing member 10 is lowered. At this time, if the IC card C is one curved upward as illustrated by solid lines in FIG. 12, the card, following the lowering movement of the card pressing member 10, is pressed toward frame 50D (the reader side terminal 11) by the bottom surface 10b of the card pressing member 10 as illustrated by two-dotted lines. Therefore, the rise, with respect to frame 50D, of the IC card C in the stop condition in the card driving path 90 is pressed down; the distance between frame 50D and IC card C is maintained constant and the information is recorded/retrieved.

Therefore, even when the IC card C in the card driving path 90 is a contact card C1, the contact condition between the contact wires 8a and the contact terminal 2 is stabilized, and the input/output of information is performed constantly. Also even when the proximity card C2 is a deformed one, the distance between the card side terminal 3 in the card C2 and the reader side terminal 11 becomes narrow. Consequently, the magnetic field generated in the coils 26 and 27 and the charge generated in the metallic plates 28 can be efficiently transmitted to the coils 5 and 6 and metallic plates 7 on the card side terminal 3, and the input/output of information is stabilized. In addition, the voltage supplied to the reader side terminal 11 is relatively reduced.

In this embodiment, the contact block 8 is arranged upstream in the card driving path 90, and the reader side terminal 11 is arranged downstream in the card driving path 90. However, this invention is not limited to this configuration. When the contact terminal 2 of the contact card C1 is positioned on the bottom side (frame 50D side) of the card driving path 90, the contact block 8 can be arranged downstream in the card driving path 90, and the reader side terminal 11 may be arranged upstream in the card driving path 90.

According to the above mentioned embodiment, the IC card reader 50 comprises a contact block 8 which puts information in/out by abutting the contact terminal 2 on the contact card C1; the reader side terminal 11 facing the non-contact terminal 3 of the proximity card C2, in which the input/output of information is accomplished by electrical potential; and a card driving path 90 through which both a contact card C1 and non-contact card C2 are commonly driven. Therefore, the IC card reader can handle both a contact card C1 and a proximity card C2.

In the above embodiment, the pairs of the driving rollers 120 and 121 are arranged avoiding the character area C1b and C2b and magnetic stripes C1a and C2a, so that IC card C is driven without being held on the character area C1b and C2b and magnetic stripes C1a and C2a by the pairs of the driving rollers 120 and 121. This results in reducing the damage to and wear-out of the character area C1b and C2b and magnetic stripes C1a and C2a caused by being held by the driving roller pairs 120 and 121, and in improving the durability of the contact card C1 and the proximity card C2.

Also, the stopper member 133 is moved by the electromagnetic solenoid 133 in/out of the card driving path 9 and 90, so the contact card C1 and proximity card C2 can pass through the card driving path 9 and 90. In this case, the driving motor (not illustrated) is not rotated counterclockwise when the input/output of information is finished, but is rotated in the same direction as that for taking the card in. With this configuration, since the IC card C can pass through the IC card reader 1 and 50, the flexibility in the direction of driving the card is increased, varying the connections between the IC card reader 1 and 50 and other devices.

In the above mentioned embodiments, the card pressing member 10 is formed to be opposite the reader side terminal 11 and positioned from the center of the card driving path 9 and 90 toward frames 1B and 50B. This configuration specifically effects correcting the IC card C having a center curved upward in the card driving path 9 and 90. In order to handle the IC card C having front-back edges with respect to the driving direction or sides curved upward in the card driving path 9 and 90, the card pressing member 10 may be formed to press the front edge or both sides of the card by, for example, forming the card pressing member 10 as a vertical concave shape.

In the first and second embodiments, the control means 4 and 40 control both the magnetic card readers 100 and 100' and the IC card readers 1 and 50; however, control means may be provided for controlling the IC card readers 1 and 50 independently. In that case, by giving a card sensor (not illustrated) a functionality of outputting the card assortment signals V1 and V2 and arranging it in the vicinity of a pair of the driving rollers 120, and by arranging a driving motor (not illustrated) as a part of the transmission mechanism 12, the IC card reader 1 or 50 independently is enabled to transact an IC card.

Next a third embodiment of this invention is described referring to the drawings.

Figure 15:
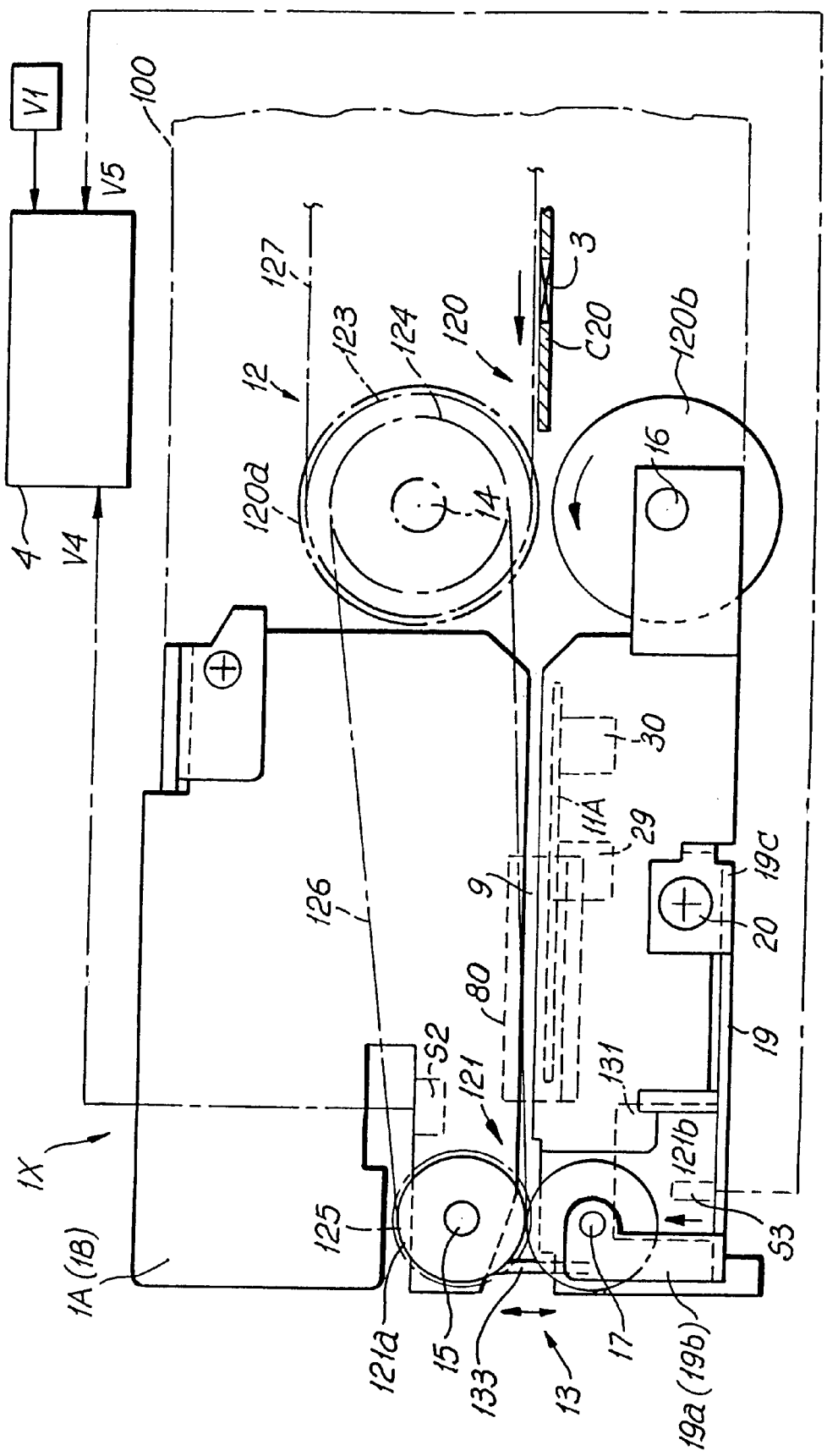
FIG. 15 is a side view of the configuration of an IC card reader showing the third embodiment of this invention.
Figure 16:
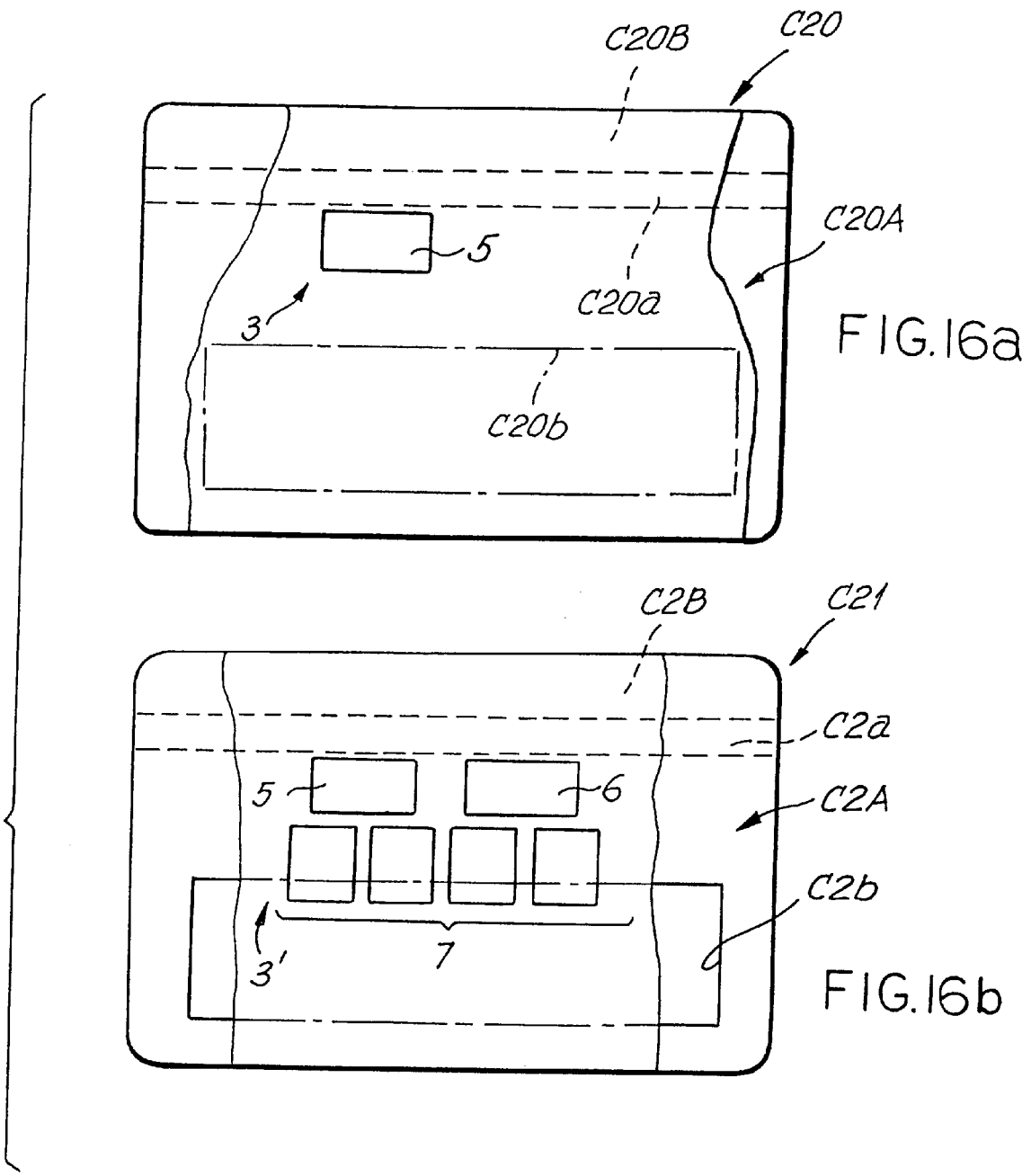
FIG. 16(a) is a plan view of the proximity IC card.
FIG. 16(b) is a plan view showing a deformed example of the proximity IC card.

The IC card reader illustrated by code 1X in FIG. 15 transacts an proximity type IC card C20 having a non-contact type input/output terminal 3 as illustrated in FIG. 16(a). The proximity card C20 illustrated in FIG. 16(a) has a character area C20b and a magnetic stripe C20a formed thereon; inside the card a non-contact type input/output terminal 3 is formed having one coil 5 on the card side.

The IC card reader 1X, as illustrated in FIG. 15, comprises a card driving path 9 through which the proximity card C20 is driven in the same manner as in the aforementioned embodiment, an IC module 11A (a signal transmission unit) for communicating with the non-contact terminal 3; a transmission mechanism 12 for driving the proximity card C20; and a card stopper mechanism 13. The basic configuration is the same as in the embodiments described before, but a magnetic passage 80 is added in this embodiment.

Figure 17:
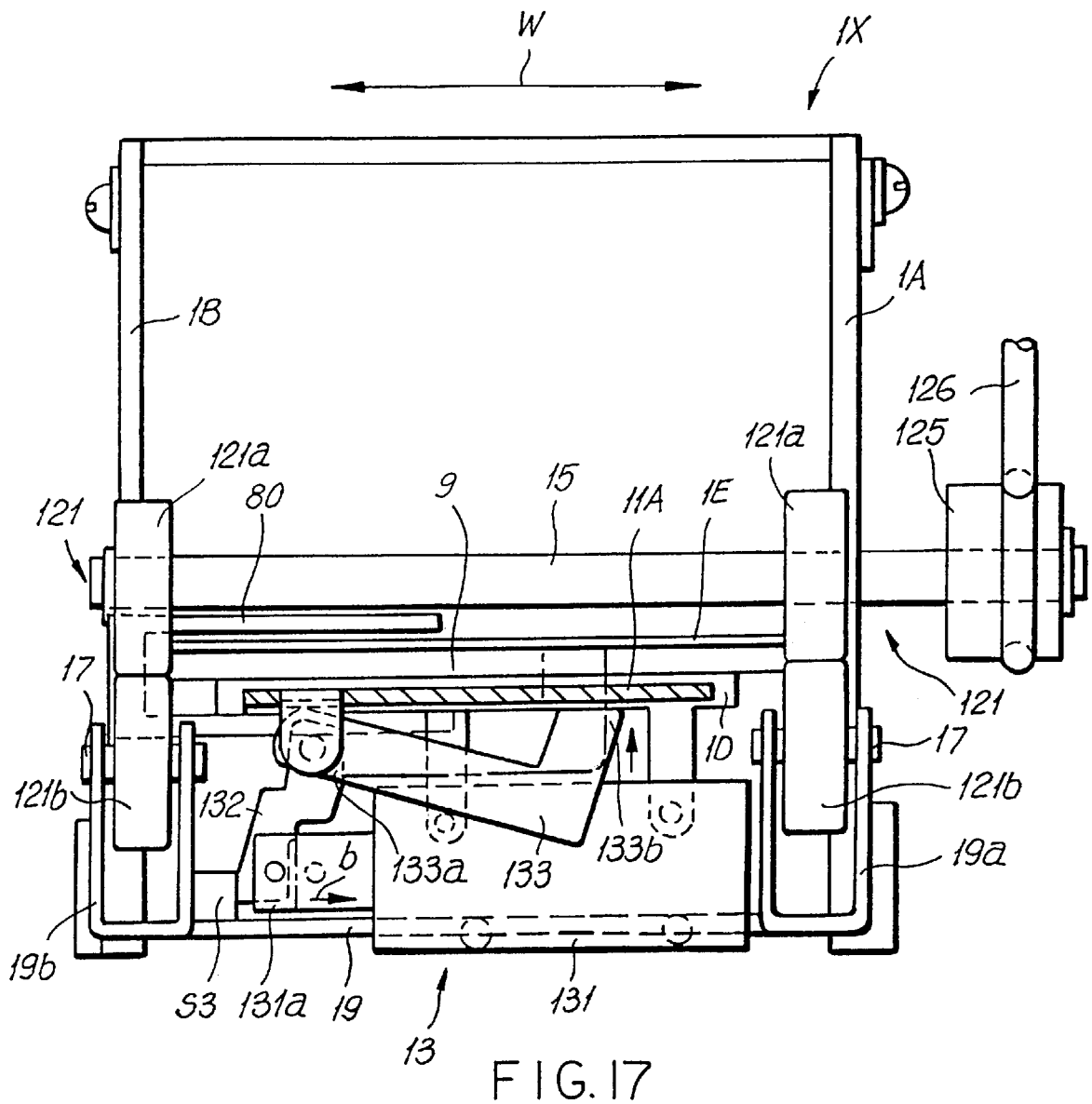
FIG. 17 is a front view of the IC card reader showing a third embodiment.

The magnetic passage 80 is formed of magnetic material as a vertical concave, and is fixed integrally with frame 1B (a base). As illustrated in FIG. 17, the magnetic passage 80 is arranged extended to the portion facing the card side coil 5, so that its concave-shaped ends sandwich the card driving path 9 from both top and bottom sides, and they also sandwich the reader side coil 26 as illustrated in FIG. 18. In other words, the magnetic passage 80 is arranged at the position where the concave-shaped ends can sandwich the card side coil 5 and reader side coil 26 from top and bottom sides when the proximity card C20 is at the stop position. As a magnetic material, a paramagnetic material which is magnetized in the same direction as the card side coil 5 and reader side coil 26, or preferably a high magnetic material such as ferrite is used.

Figure 19:
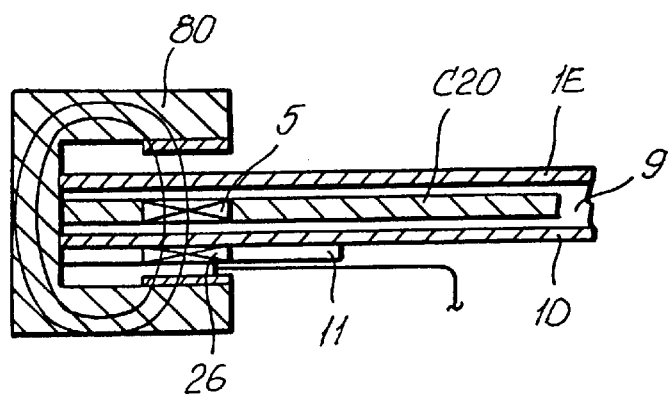
FIG. 19 is a magnified view showing a magnetic field property of the reader side coil and card side coil.

The IC module 11A is secured on frame 1D and, as illustrated in FIG. 18, comprises the reader side coil 26 which is wound in the same direction and times as the card side coil 5 of the non-contact terminal 3. When a voltage is supplied to the reader side coil 26 and the IC chip via the connectors 29 and 30, as illustrated in FIG. 19, the magnetic flux generated in the reader side coil 26 is transmitted to the card side coil 5, and the voltage which varies according to information is electromagnetically transduced to generate a electromotive force. The electromotive force varies according to the displacement of the supplied voltage; therefore, the potential (voltage) at that time is converted to put information in/out with respect to the proximity card C20. At that time, the magnetic flux generated in the reader side coil 26 is transmitted to the card side coil 5, and it also passes through the flux path 80 to be a closed loop; therefore, the amount of the magnetic flux transmitted to the card side coil 5 increases, and thus the electromagnetic transducing efficiency of the voltage supplied to the reader side coil 26 is improved compared to the configuration without the flux path 80.

Thus, since the IC card reader 1X has the magnetic passage 80 (the flux path between the card side coil 5 and reader side coil 26) therein, the amount of the magnetic flux transmitted to the card side coil 5 increases, the electromagnetic transducing efficiency of the voltage supplied to the reader side coil 26 is improved, and the electromotive force generated in the card side coil 5 becomes large. Therefore, while one tries to obtain the same electromotive force, the supplied voltage can be reduced and the electromagnetic wave generated can be weakened. As a result, the influence and reception of the electromagnetic wave can be reduced for the magnetic stripe C20a; the poor recording/retrieval of magnetic information or the interception of information by electromagnetic wave analysis can be further reduced. In addition, the use of a high magnetic material member and the like for the magnetic passage 80 improves the electromagnetic transducing efficiency, making it possible to reduce poor recording/retrieval of magnetic information and the interception of information by the electromagnetic wave analysis.

This embodiment has been described using the proximity card C20 having with one card side coil 5 as a non-contact terminal 3. However, the invention is not limited to this card type. For example, the proximity card C21 illustrated in FIG. 16(b) may be used. Using such a proximity card C21, an IC module having reader side coils 26 and 27 and a plurality of conductive metallic plates 28, which correspond to the card side coils 5a and 6 and metallic plates 28 on the proximity card C21, is used in place of the IC module 11A. At this time, the flux path 80 may be arranged so that one flux path 80 sandwiches the reader side coils 26 and 27 or a flux path 80 is provided for each of the reader side coils 26 and 27.

Figure 20:
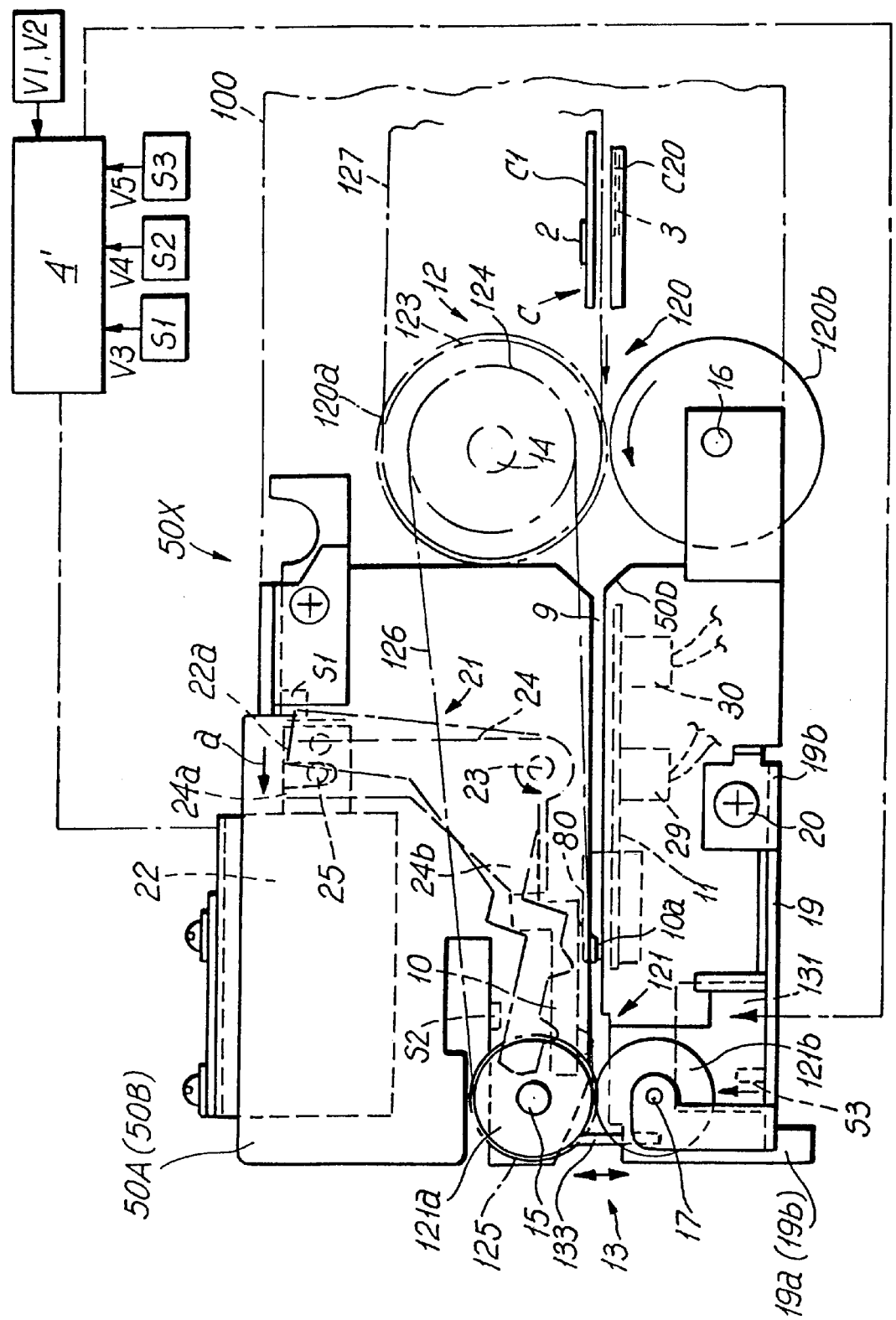
FIG. 20 is a side view of the configuration of an IC card reader showing a fourth embodiment of this invention.

Next, a fourth embodiment of this invention is described. The IC card reader 50X illustrated in FIG. 20 is a two-way card processor which transacts different kinds of IC cards C; in this embodiment, it transacts the already-described proximity card C20 illustrated in FIG. 16(a) and a contact type IC card C1 having a contact type input/output terminal 2 on the card front C1A illustrated in FIG. 8(a). The members having the same configuration and operation as in the above described embodiments have the same designations.

Figure 21:
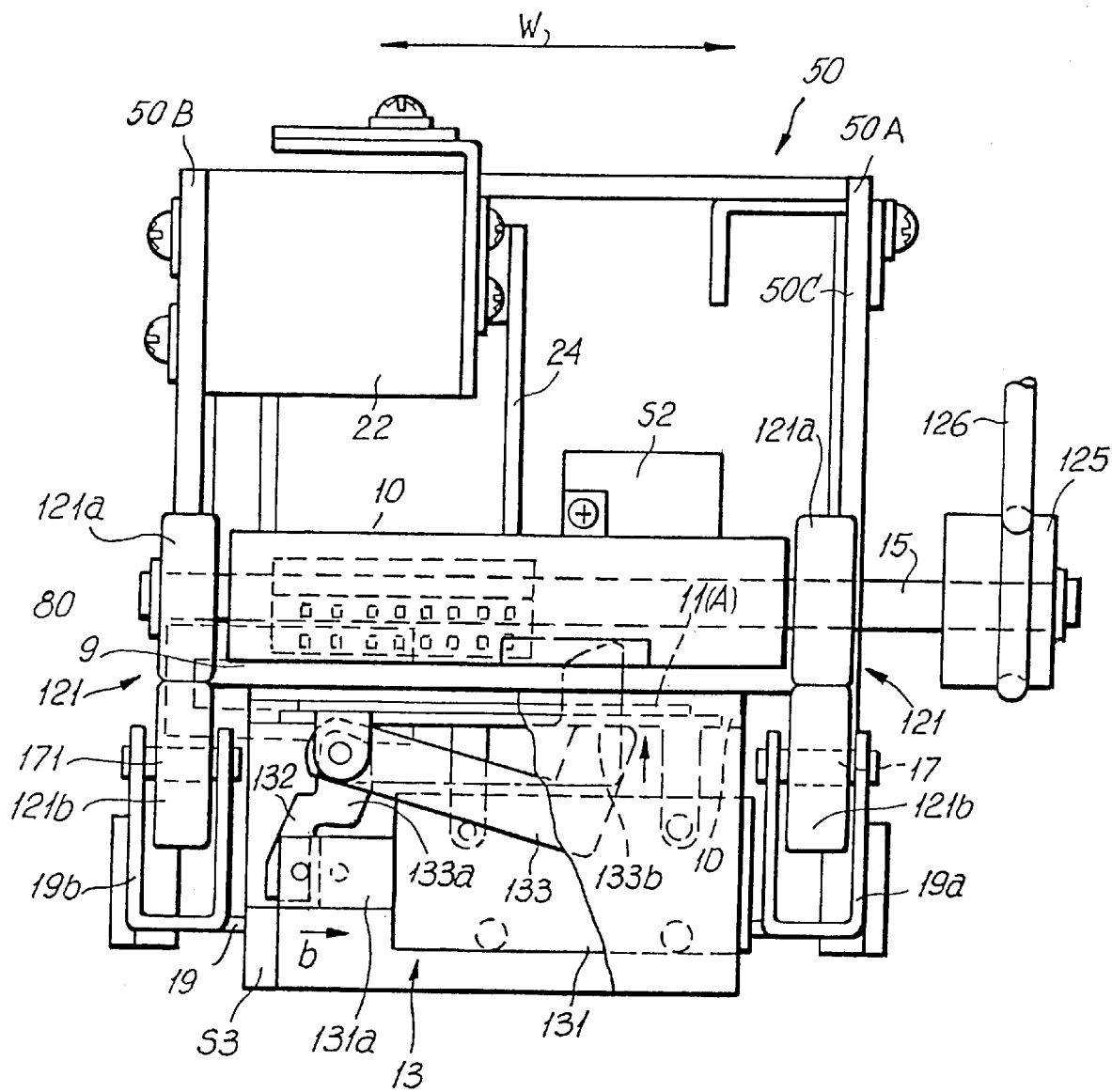
FIG. 21 is a front view of the IC card reader showing the fourth embodiment.

The IC card reader 50X, as illustrated in FIGS. 20 and 21, has a contact block 10, which abuts the contact terminal 2, positioned upstream in the card driving path 9 though which the contact card C1 and the proximity card C20 are commonly driven; it also has an IC module 11A (a signal transmission unit) for communicating signals with the non-contact terminal 3, positioned downstream in the card driving path 9; in the same manner as in the already-described embodiment, it comprises the transmission mechanism 12 for driving the contact card C1 and proximity card C20, the card stopper mechanism 13 and like.

The contact block 10 has a plurality of contact wires 10a which contact the contact terminal 2, project toward the card driving path 9, and is supported by a contact-detach mechanism 21. The contact-detach mechanism 21 comprises the electromagnetic solenoid 22 (an actuator) and a rotary arm 24 which is rotatably supported by the shaft 23 with respect to frame 50C fixed inside side plates 1A and 1B; it has the same configuration as in the previously described embodiments, and therefore its detailed descriptions are omitted.

Figure 22:
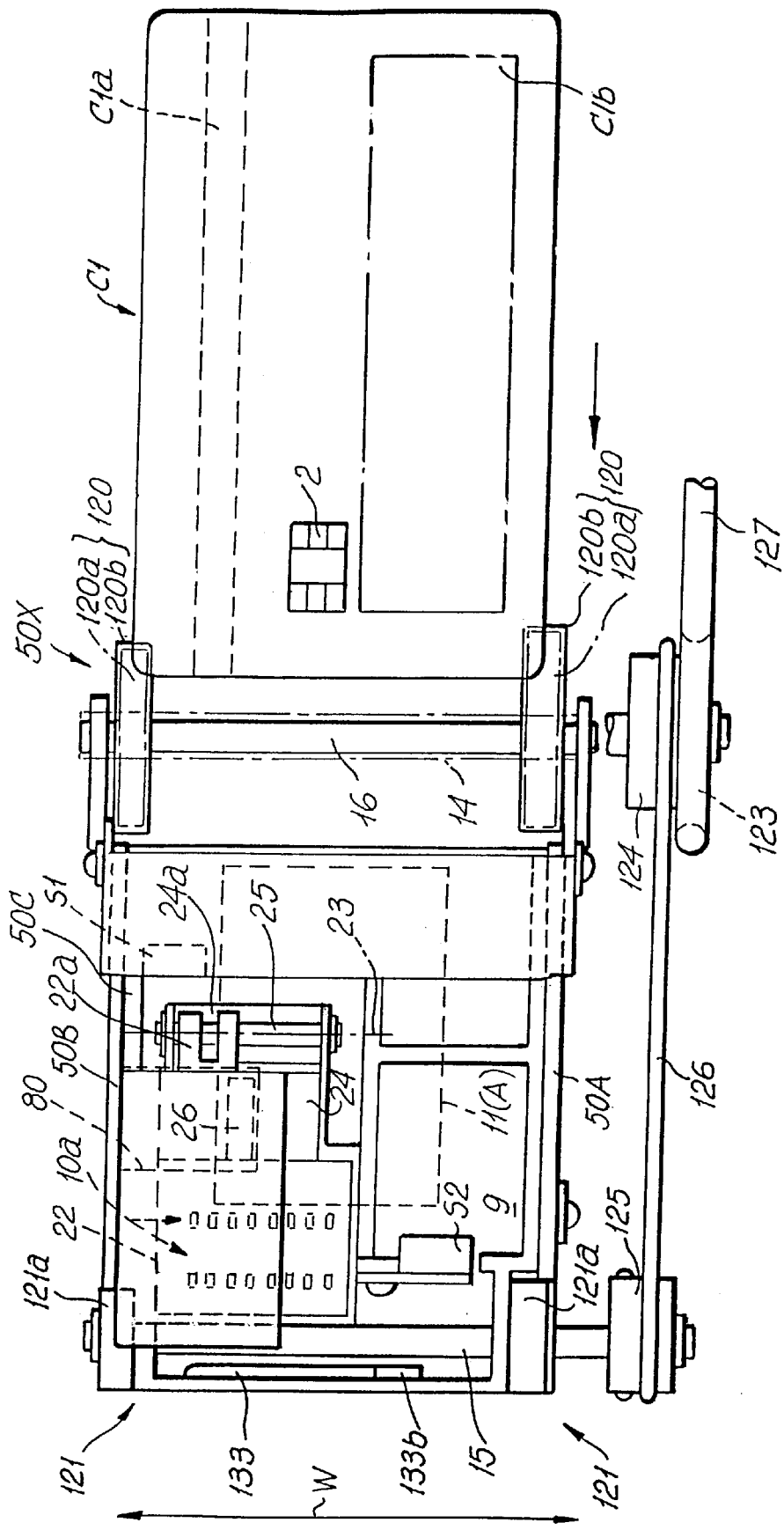
FIG. 22 is a plan view showing the contact type IC card as inserted in the fourth embodiment.
Figure 23:
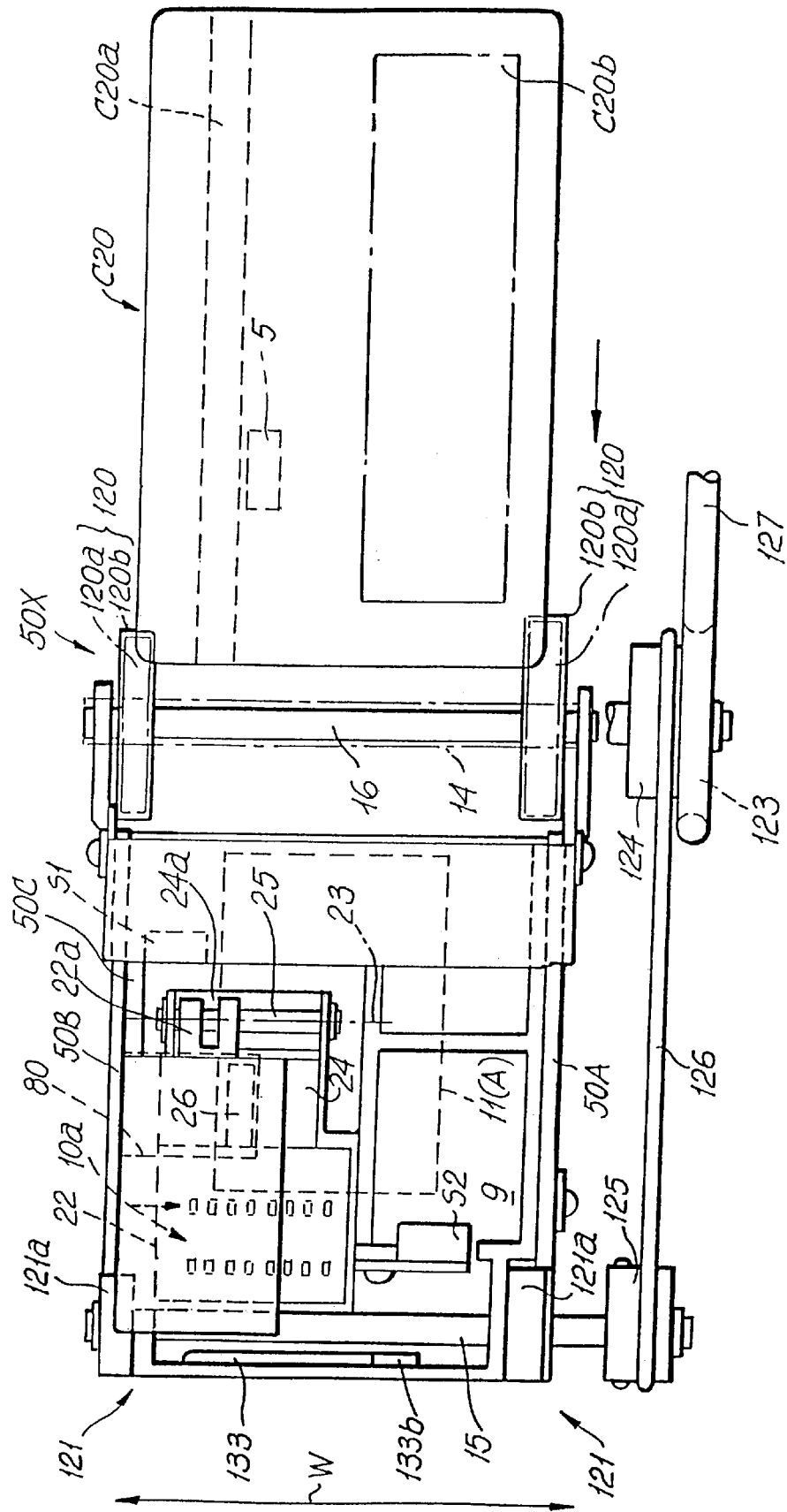
FIG. 23 is a front view showing the contact type IC card as inserted in the fourth embodiment.

The magnetic passage 80 formed of magnetic material in a vertical concave shape is fixed integrally with frame 50B near the IC module 11A. The magnetic passage 80, as illustrated in FIG. 21, sandwiches the card driving path 9 from top and bottom, and is positioned at the area opposite the reader side coil 26 as illustrated in FIGS. 22 and 23. That is, the magnetic passage 80 is positioned to sandwich the card side coil 5 and the reader side coil 26 from top and bottom when the proximity card C20 is at the stop position.

Figure 24:
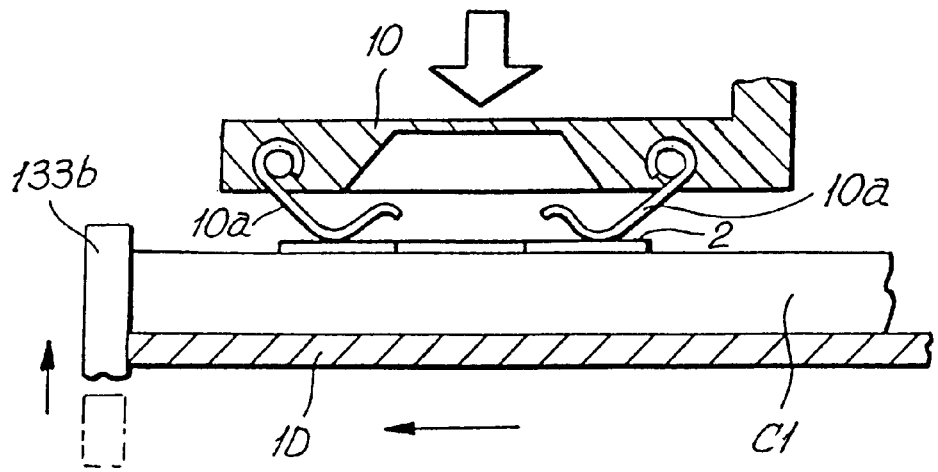
FIG. 24 is a magnified view showing that the contact type input/output terminal and the contact block abut each other.
Figure 25:
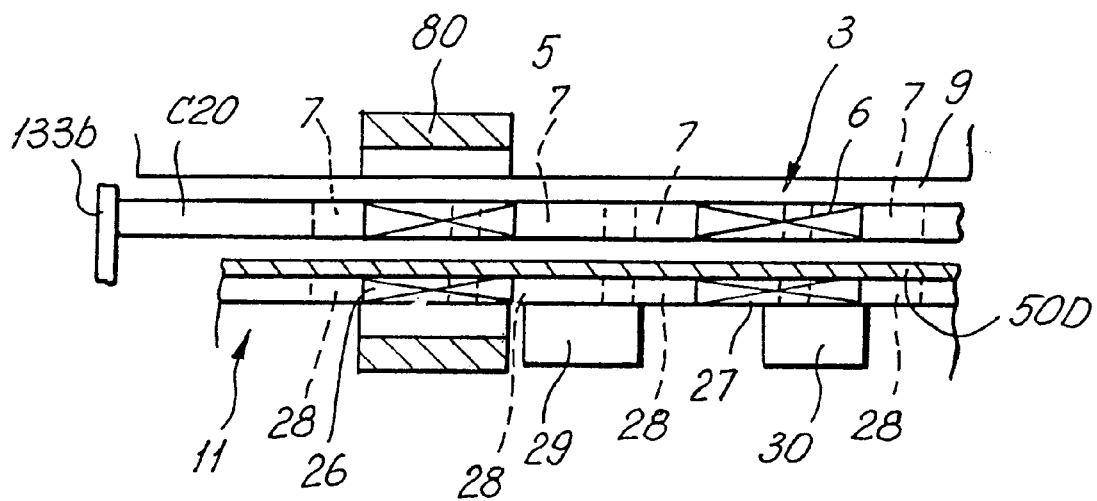
FIG. 25 is a magnified view showing that information is communicated between the non-contact type input/output terminal and the reader side coil.

The IC card reader 50X having such a configuration lowers the contact block 10 by turning the electromagnetic solenoid 22 on when the IC card C inserted is a contact card C1. Then, as illustrated in FIG. 24, the contact wires 10*a* projecting from the contact block 10 contact the contact terminal 2 of the contact card C1 which has been stopped in the card driving path 9, then the information is put into/taken out of the contact card C1. On the other hand, when the IC card 20 inserted is a proximity card, the assortment signal V2 is supplied to the control means 4', and the proximity card C20 is driven in the card driving path 9 as illustrated in FIG. 23. The proximity card C20 is first driven in the card driving path 9 being held by a pair of the driving rollers 120 and is sensed by the sensor S2; the stop signal V4 is provided to stop the driving motor and turn on the electromagnetic solenoid 131; the stopper member 133 is rotated from the receded position to the entering position; its tip 133*b* enters the card driving path 9 and contacts the proximity card C20 as illustrated in FIG. 25; then the proximity card is stopped at the stop position at which the non-contact terminal 3 and IC module 11 face each other. Note that the above operation is performed the same as the operation for the proximity card C21.

When the movement of the movable piece 131*a* is sensed by the sensor S3, the stopper signal V5 is provided, and a voltage is supplied to the reader side coil 26 and the IC chip via the connectors 29 and 30. Then, as illustrated in FIG. 25, the magnetic flux generated in the reader side coil 26 is transmitted to the card side coil 5, the voltage which varies according to the information is electromagnetically transduced to generate an electromotive force, and the input/output of information is performed to/from the proximity card C20 and C21. At this time, the magnetic flux generated in the reader side coil 26 is transmitted to the card side coil 5 and passes through the flux path 80 to be in a closed loop. Therefore, the amount of the magnetic flux transmitted to the card side coil 5 increases, and thus the electromagnetic transducing efficiency of the voltage supplied to the reader side coil 26 is improved compared to the configuration without the flux path 80.

After the input/output of information to/from the contact card C1 or the proximity card C20 is performed, the current to the electromagnetic solenoids 22 and 131 is interrupted to turn it off. Then, the stopper member 133 and the contact block 10 are caused to recede by an elastic potential energy of a spring (not illustrated) from the card driving path 9, and the driving motor is driven in the left direction which is opposite that for entering the card. The left rotation reactivates the IC card C in the card driving path 9 toward the slot, and is returned.

In this manner, the IC card reader 50X comprises the magnetic passage 80 which is a flux path between the card side coil 5 and reader side coil 26. Therefore, the amount of the magnetic flux transmitted to the card side coil 5 increases; the electromagnetic transducing efficiency of the voltage supplied to the reader side coil 26 is improved; and the electromotive force generated in the card side coil 5 becomes large. Consequently, the influence or reception of electromagnetic waves on the magnetic stripes C1*a* and C20*a* can be reduced, making it possible to reduce the poor recording/retrieval of magnetic information and the interception of information by the electromagnetic wave analysis.

In addition, in the IC card reader 50X the contact block 10 which puts information in/out from the contact terminal 2 on the contact card C1, the IC module 11A which puts information in/out from the non-contact terminal 3 on the proximity card C1 using the electrical potentials, and the stopper member 133 are installed. Therefore, the contact card C1 and proximity card C20 can be stopped by the common stopper 133, and thus the IC card reader can transact both the contact card C1 and proximity card C20. Moreover, since the contact card C1 and proximity card C20 driven in the card driving path 9 are stopped at a predetermined position in the card driving path 9 by one stopper member 133, another stopper member 133 does not need to be arranged separately.

Further, the electromagnetic solenoid 22 is not turned on unless the stopper member 133 arranged on the end of the card driving path 9 is actuated, that is, the stopper signal V5 is provided. For this reason, until the contact card C1 contacts the stopper member 133, the contact block 10 is at a receded position from the card driving path 9, making it possible to reduce driving resistance when the contact card C1 is driven.

Figure 26:
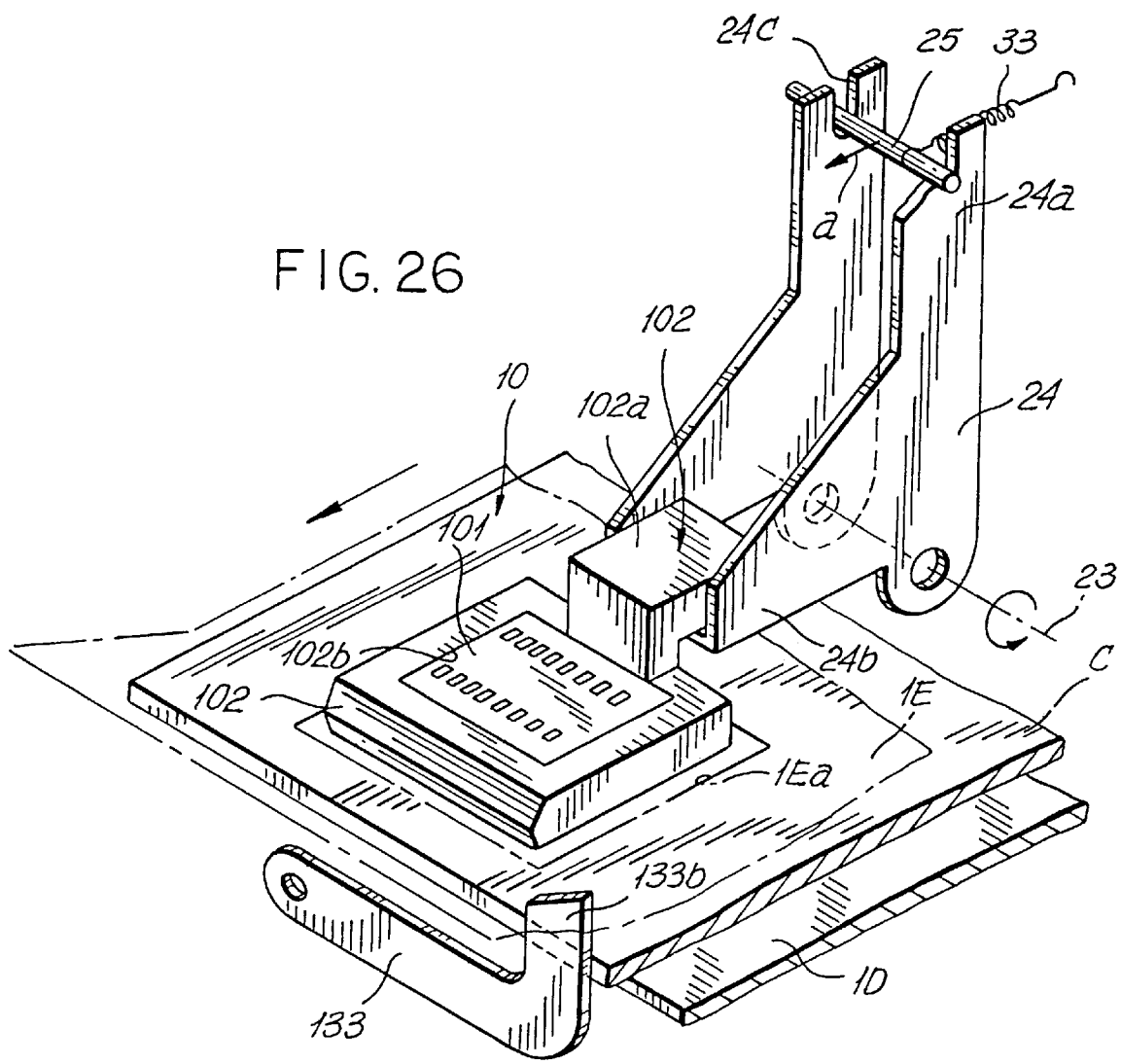
FIG. 26 is a perspective view showing the configuration of a contact-detach mechanism as a part of the pressing means.

The embodiment illustrated in FIG. 26 is an embodiment, as in the previously described IC card reader configured to commonly drive a contact card C1 or a proximity card C2 as illustrated in FIG. 8, which comprises a contact block which is positioned upstream in the driving path and capable of contacting the contact terminal, and a pressing means for actuating the contact block 10; for a non-contact type card, the contact block 10 functions as a card presser as well.

Figure 27:
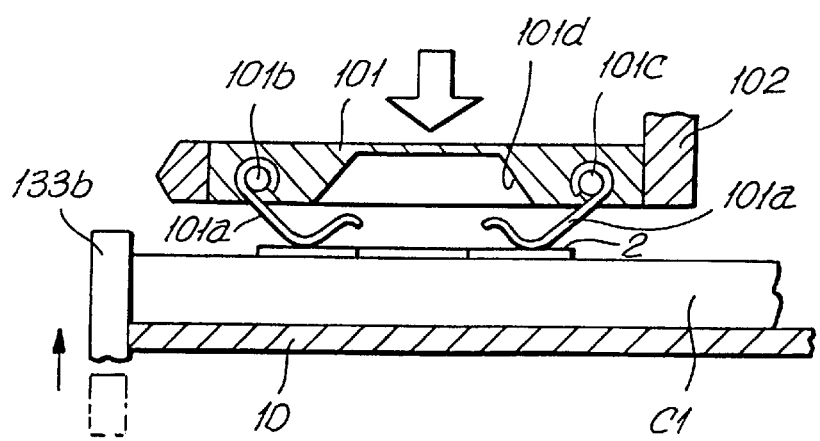
FIG. 27 is a magnified view showing that the contact type input/output terminal abuts the contact wires.
Figure 28:
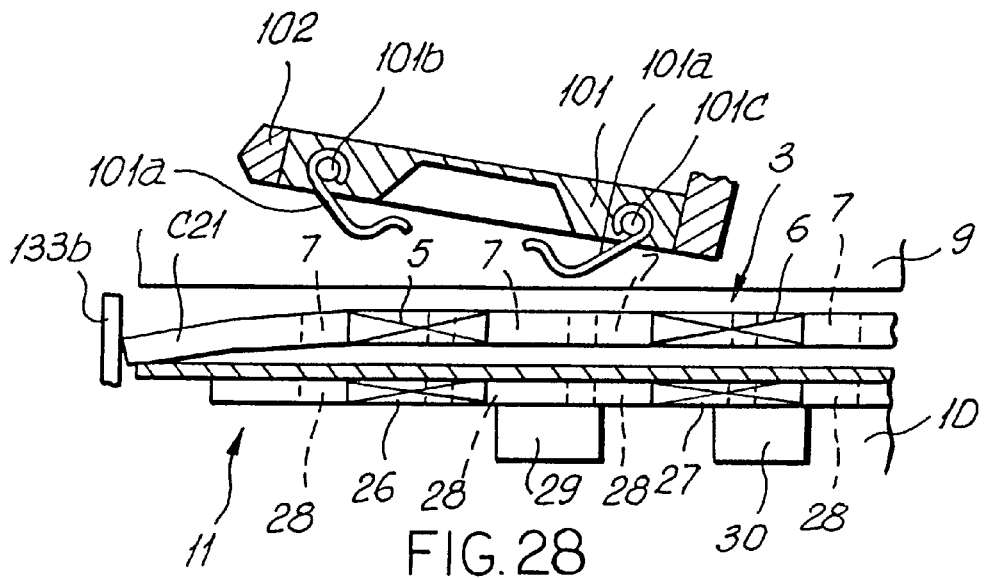
FIG. 28 is a magnified view showing that the signal is communicated between the signal transmission area and the non-contact type input/output terminal.

In FIGS. 26 and 27, the contact block 10 comprises a block main body 101 having a plurality of contact wires 101*a* for putting information in/out by contacting the contact terminal 2, and a holder 102. The contact wires 101*a* are formed of a conductive spring material and the like, so that they have elasticity; one end of a wire is engaged by pins 101*b* and 101*c* passing through the block main body 101 as illustrated in FIG. 27; a W-shaped center portion is projected toward the card driving path 9 from the block main body 101. At the center of the holder 102, an opening 102*b* is formed in which the block main body 101 is adhered; the adhered contact block 101 faces the card driving path 9 through the opening 1E*a* of frame 1E. On the block main body 101 a step 101*d* is formed for the allowance for the elastic deformation and displacement of the contact wires 101*a*.

The block main body 101 is supported via the rotary arm 24 to the contact-detach mechanism 21 made of the electromagnetic solenoid 22 and the like. The rotary arm 24 is bent in a concave shape in a cross-section as illustrated in FIG. 26, and is configured such that its upper end 24*a* is actuated by the electromagnetic solenoid 22 in the same manner as in the previously described embodiments. When the electromagnetic solenoid 22 is activated, the rotary arm 24 is placed at the entering position, the contact wires 101*a* are pressed against the contact terminal 2, and the proximity card C2 is pressed toward frame 1D constituting the bottom surface of the card driving path 9.

With the configuration of the IC card reader mentioned above, when the electromagnetic solenoid 22 is turned on, the rotary arm 24 is displaced from the distant position to the card contacting position, pivoting around the shaft 23, and the contact block 10 is lowered, the contact wires 101*a* projecting from the block main body 101 are pressed downward to the contact terminals 2 on the contact card C1 which has been stopped in the card driving path 9, as illustrated in FIG. 27, to put information in/out. At that time, the contact card C1 is pushed to the frame 1D side by the contact wires 101a, so even the deformed card C1 is pressed downward, correcting the deformation of the card, and the information can be recorded/retrieved.

Figure 29:
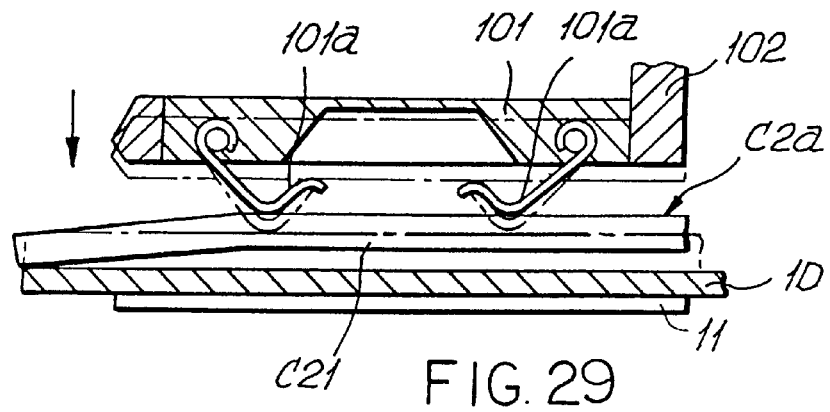
FIG. 29 is a magnified view showing that the proximity IC card is pressed by the contact block.

On the other hand, when the IC card C inserted is a proximity card C2, the assortment signal V2 is supplied to the control means 4, and the proximity card C2 is driven to the card driving path 9. The tip 133b of the stopper member 133 enters the card driving path 9 and abuts the driven proximity card C2; then the proximity card C2 stops so that the non-contact terminal 3 faces the IC module 11. After this, when the electromagnetic solenoid 22 is turned on, the rotary arm 24 is displaced from the distant position to the card contacting position, pivoting around the shaft 23, and the contact block 10 is lowered. As illustrated in FIG. 29, the contact wires 101a projecting from the block main body 10 are pressed onto the upper surface C2A of the proximity card C2. When the proximity card C2 is curved upward as illustrated by solid lines, it is pressed to frame 1D by the contact wires 101a as illustrated by two dotted lines; the rise of the card C2 with respect to frame 1D is pressed down; and the input/output of information is accomplished to/from the proximity card C2.

According to the above mentioned embodiment, since the inserted IC card C is pressed by the contact wires 101a which put information into/taken out of the contact card C1, the contact wires 101a function as the pressing member as well. As a result, a pressing mechanism for pressing the IC card C does not need to be specifically provided, leading to space conservation and reduced cost.

In the above mentioned embodiment, the deformed IC card C is corrected by pressing the contact card C1 and proximity card C2 toward frame 1D with only contact wires 101a. However, as illustrated in FIG. 30, the block main body 101 may be attached to the holder 103 having card pressing members 34 and 35 to press the IC card C with both the card pressing members 34 and 35 and the contact wires 101a.

Figure 30:
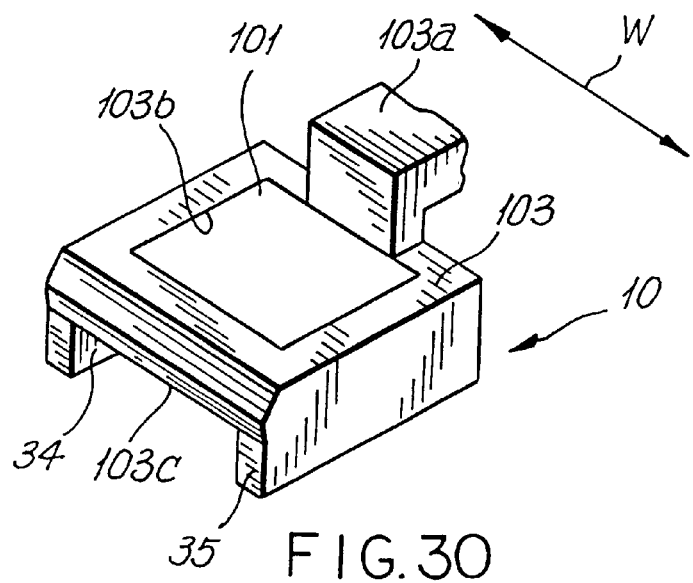
FIG. 30 is a perspective view showing a modified example of a holder having a card pressing member.

The holder 103 illustrated in FIG. 30 has the block main body 101 adhered to the opening 103b formed at the center thereof in the same manner as the holder 102; the base edge 103a is adhered to a moving end 24b of the rotary arm 24, being freely attach/detachable with respect to the IC card C. The card pressing members 34 and 35 are formed integrally at both ends, in the card width direction W, of the bottom surface 103c of the holder 103. The card pressing members 34 and 35 may be mounted in the holder 103 after being formed separately from the holder 103. The height of the card pressing members 34 and 35 are set so that the contact wires 101a first contact the contact terminal 2 or the upper surface C2A of the proximity card C2.

When the card pressing members 34 and 35 are set in such a manner, and when the holder 103 is lowered, the contact wires 101a first abut the contact terminal 2, the contact wires 101a pressure the contact terminal 2 as the holder 103 goes down, and the bottom surface of the card pressing members 34 and 35 pressures the upper surface of the contact card C1. Also, the contact wires 101a first abuts the upper surfaces of the proximity card C2, the contact wires 101a pressure the upper surface of the proximity card C2 as the holder 103 goes down, and the bottom surfaces of the card pressing members 34 and 35 pressure the proximity card C2.

Therefore, when it presses the curve-deformed contact card C1 or proximity card C2, the load on the contact wires 101a is reduced and the durability of the contact wires 101a is improved, making it possible that the IC card C is pressed more surely toward the frame 1D side. For the proximity card C2, the non-contact terminal 3 can be made closer to the signal transmission unit 11, thus making it possible that the input/output of the information to/from the card is stabilized.

Here, the card pressing means 34 and 35 are positioned at both ends in the card width direction W, at the bottom surface 103C of the holder 103, but the invention is not limited to this position. For example, it may be placed at front-back ends of the bottom surface 103c of the holder 103 placed orthogonal to the card width direction W, or on the outer circle surface of the holder 103. Also, the card pressing members 34 and 35 may be provided on the block main body 101, instead of the holder 103.

According to this invention, a proximity IC card having a card side terminal is pressed by a card pressing member toward a reader side terminal. Therefore, when the proximity IC card is curved, the distance between the card side terminal and reader side terminal can be narrowed and stabilized. Consequently, the stable input/output of information is made possible, reducing the chances for card jams and driving resistance, and improving the durability of the proximity IC card.

In addition, pressing the contact IC card and proximity IC card toward the reader side terminal by the card pressing member corrects the deformation even when the contact IC card and proximity IC card are curved. For this reason, the chances for card jams and driving resistance are reduced, improving the durability of the contact IC card and the proximity IC card. Further, the distance between the card side terminal of the proximity IC card and the reader side terminal is narrowed, enabling the stable input/output of information. In addition, since a contact block which abuts the contact type input/output terminal is provided, the IC card reader can transact both the contact type IC card and proximity type IC card.

According to this invention, at the driving stop position for the proximity IC card, the magnetic passage is provided as a flux path between the card side coil and the reader side coil which is positioned opposite the card side coil and communicates information with the card side coil. Therefore, the magnetic flux from the reader side coil is transmitted to the card side coil, passing through the flux path; the amount of the magnetic flux is reduced which escapes when it is transmitted between the reader side coil and the card side coil, thus improving the electromagnetic transducing efficiency.

Moreover, according to this invention, the contact block is arranged on one side of interposing the card driving path through which the contact IC card and proximity IC card can be commonly driven; on the other hand, the signal transmission unit for communicating signals with the non-contact type input/output terminal is provided on the other side of interposing the card driving path. Therefore, it is possible to transact the contact type IC card and proximity IC card in one IC card reader. Also, the contact block is configured to move attachably and detachably with respect to the contact type input/output terminal; therefore, the driving resistance to the contact IC card and proximity IC card driven through the card driving path can be reduced.

In addition, for the communication of information with the proximity IC card, if the contact block which is formed attachably and detachably to the contact type input/output terminal of the contact IC card, and is provided on one side of interposing the card driving path, is configured to be pressed to the proximity IC card by a pressing means, the deformation of the proximity IC card can be corrected without providing a special pressing mechanism for the card.

While the foregoing description and drawings represent the preferred embodiments of the present invention, it will be obvious to those skilled in the art that various changes and modifications may be made therein without departing from the true spirit and scope of the present invention.

What is claimed is:

1. An IC card reader comprising:

a card driving path being provided through which a proximity IC card having a card side terminal as a non-contact input/output terminal is driven, said card side terminal capable of providing and receiving electrical signals;

a reader side terminal being positioned opposite said card side terminal at a stop position of said proximity IC card; said reader side terminal being capable of providing and receiving electrical signals for communcation with said card side terminal; and a card pressing member being provided opposite said reader side terminal and, upon interposing said proximity IC card therebetween, for pressing said proximity IC card toward said reader side terminal.

2. The IC card reader of claim 1, wherein said card pressing member is made movable by a driving mechanism between a pressing position to press said proximity IC card in said card driving path and a receded position where the pressing member recedes from said card driving path.

3. The IC card reader of claim 2, wherein said card driving path is configured for a contact IC card having a contact input/output terminal on its card front and includes a contact block capable of abutting said contact input/output terminal of said contact IC card being arranged on one side of said card driving path and a reader side terminal for communicating signals with said card side terminal being mounted on the other side of said card driving path and at the bottom surface of a frame constituting said card driving path.

4. The IC card reader of claim 3, wherein a width dimension of a thickness direction of said card driving path is set to a width which allows at least one of a deformed contact IC card and proximity IC card therewithin.

5. The IC card reader of claim 1, wherein said card driving path is also configured capable of driving a contact IC card having a contact input/output terminal on its surface; a contact block abuttable to said contact input/output terminal of said contact IC card being arranged on one side of said card driving path; said signal transmission unit for communicating signals with said non-contact input/output terminal of said proximity IC card being arranged on the other side of said card driving path; and pressing means for pressing said contact block to said proximity IC card when communicating information with said proximity IC card.

6. The IC card reader of claim 5, wherein said proximity IC card is pressed by contact wires having elasticity which can be pressured against said contact input/output terminal provided on said contact block.

7. The IC card reader of claim 6, wherein said pressing means has a card pressing member, being arranged on said contact block, projecting toward said card driving path; said proximity IC card being pressed toward said signal transmission unit by said card pressing member and said contact wires.

8. The IC card reader of claim 5, wherein a width dimension in a thickness direction of said card driving path is set at a value which allows curve deformation of said contact IC card and proximity IC card therewithin.

9. The IC card reader of claim 6, wherein said signal transmission unit is mounted on a frame constituting said card driving path.

10. The IC card reader of claim 6, wherein the contact block has a step which is formed for allowing an elastic deformation and displacement of said contact wires.

11. In an IC card reader which transacts a proximity IC card having a card side coil constituting a non-contact input/output terminal, comprising:

a card driving path being provided through which said proximity IC card can be driven;

a reader side coil being positioned opposite said card side coil at a stop position of said proximity IC card, for signal communication with said card side coil; and a magnetic passage, formed to interpose said card driving path and said reader side coil therebetween, being a flux path between said card side coil and said reader side coil.

12. The card reader of claim 11, wherein said magnetic passage is made of a magnetic material which is formed integrally with a frame constituting said card driving path.

13. The card reader of claim 11, wherein said IC card reader is an IC card reader which transacts said proximity IC card and a contact IC card having a contact input/output terminal on its surface; said card driving path being configured to be capable of driving said contact IC card; a contact block capable of abutting said contact input/output terminal of said contact IC card being provided on one side of said card driving path; and a reader side coil for signal communication with said card side coil being provided on the other side of said card driving path.

14. An IC card reader comprising:

a card driving path through which can be driven a contact IC card having a contact input/output terminal on its surface and a proximity IC card having a non-contact input/output terminal;

a contact block which is positioned on one side of said card driving path, and abutting said contact input/output terminal;

a signal transmission unit which is positioned on the other side of said card driving path and near said card driving path for signal communication with said non-contact input/output terminal; and a magnetic passage, formed to interpose said card driving path and said signal transmission unit therebetween, being a flux path between said non-contact input/output terminal and said signal transmission unit.

15. The IC card reader of claim 14, wherein one of said contact IC card and said proximity IC card is driven in said card driving path by a transmission means which stops when a stop signal is supplied, and the stop positions of said contact IC card and proximity IC card are set at a common position.

16. The IC card reader of claim 14, wherein said contact block is formed attachably and detachably movable with respect to said contact input/output terminal, and said signal transmission unit is installed integrally with a frame constituting said card driving path arranged on the other side of said card driving path.

17. The IC card reader of claim 16, wherein one of said contact IC card and said proximity IC card is driven in said card driving path by a transmission means which stops when a stop signal is supplied, and stop positions are identical where card edges of said contact IC card and proximity IC card are stopped by said transmission means.

18. The IC card reader of claim 11, comprising a stopper which is placed in said card driving path and is commonly used for controlling stop positions for said contact IC card and proximity IC card; wherein said contact block and said signal transmission unit are arranged opposite the IC cards stopped by said common stopper.

19. The IC card reader of claim 18, wherein said contact block is formed which moves attachably and detachably to and from said contact type input and output terminal of said contact IC card stopped by said common stopper, and said signal transmission unit is mounted on a frame constituting said card driving path.

20. The IC card reader of claim 18, wherein a transmission mechanism is provided which transmits said contact IC card and proximity IC card in said card driving path and stops driving when a stop signal is supplied; said common stopper moving in and out of said card driving path.

21. The IC card reader of claim 20, wherein said transmission mechanism has at least one pair of driving rollers which are arranged to avoid magnetic stripe and embossed character areas formed on said contact IC card and proximity IC card.

* * * * *